United States Patent
Lin et al.

(10) Patent No.: US 12,431,657 B2
(45) Date of Patent: Sep. 30, 2025

(54) MODULE CONNECTOR

(71) Applicant: P-TWO INDUSTRIES INC., Taoyuan (TW)

(72) Inventors: Hsien-Chang Lin, Taoyuan (TW); Chun-Wei Chang, Taoyuan (TW); Chia-Chen Wei, Taoyuan (TW)

(73) Assignee: P-TWO INDUSTRIES INC., Taoyuan (TW)

( * ) Notice: Subject to any disclaimer, the term of this patent is extended or adjusted under 35 U.S.C. 154(b) by 443 days.

(21) Appl. No.: 18/157,719

(22) Filed: Jan. 20, 2023

(65) Prior Publication Data

US 2023/0246376 A1  Aug. 3, 2023

(30) Foreign Application Priority Data

Jan. 28, 2022 (TW) .................................. 111103997
Feb. 26, 2022 (TW) .................................. 111107203

(51) Int. Cl.
*H01R 13/436* (2006.01)
*H01R 13/506* (2006.01)
*H01R 13/629* (2006.01)

(52) U.S. Cl.
CPC ......... *H01R 13/436* (2013.01); *H01R 13/506* (2013.01); *H01R 13/629* (2013.01)

(58) Field of Classification Search
None
See application file for complete search history.

(56) References Cited

U.S. PATENT DOCUMENTS

| | | | | |
|---|---|---|---|---|
| 4,008,941 | A * | 2/1977 | Smith | H01R 24/50 439/578 |
| 4,113,341 | A * | 9/1978 | Hughes | H01R 13/6641 439/620.21 |
| 6,163,958 | A * | 12/2000 | Suzuki | H01R 43/01 29/865 |
| 2014/0030556 | A1 * | 1/2014 | Beer | H01R 12/732 429/7 |

* cited by examiner

*Primary Examiner* — Oscar C Jimenez
(74) *Attorney, Agent, or Firm* — MUNCY, GEISSLER, OLDS & LOWE, P.C.

(57) ABSTRACT

A module connector comprising a first connecting component and a second connecting component. The first connecting component includes a first base, a plurality of first conductors and a plurality of first clamping parts. The first base includes a first body, a plurality of first cable grooves, a plurality of first through holes and a plurality of third cable grooves. The first body forms the first cable grooves and the third cable grooves to be able to accommodate the cables. The central axes of the first through holes are at a first angle with the first cable grooves and pass through the first body, and one ends of the first through holes communicate with the first cable grooves. The first conductors are disposed in the first cable grooves. The second connecting component can connect with the first connecting component through the cables, so that at least one of signals and power can be transmitted between the second connecting component and the circuit board.

32 Claims, 32 Drawing Sheets

MODULE CONNECTOR

FIELD OF THE INVENTION

The invention relates to the field of connectors, and more particularly, to module connectors for light source modules.

DESCRIPTION OF THE PRIOR ART

Traditionally, a liquid crystal display (LCD) panel consists mainly of a liquid crystal layer and a light emission layer (or backlight), wherein the liquid crystal layer requires the use of the backlight to display images.

Backlight of prior art is made of several groups of light emitting diode (LED) modules. These LED modules are distributed under the liquid crystal layer with the LEDs producing an area light source irradiating upon the liquid crystal layer.

These groups of LED modules are interconnected through cables. Since LCD panels vary in size, designs customized according to the size are required for LED modules, thus placing constraints on the designs of circuit layout. Furthermore, if a LED module is damaged, the entire set has to be replaced, which makes it expensive and difficult to replace.

In view of the shortcomings in the prior art, a module connector is proposed by the present disclosure address the existing shortcomings.

SUMMARY OF THE INVENTION

A first objective of the present disclosure is to provide a module connector that is applicable to one or more light strips (or light emitting units), allowing the light strips to be provided on any arbitrary locations of a cable.

In accordance with the aforementioned module connector, a second objective of the present disclosure is to enable serial connection of any number of light strips to accommodate display panels of different sizes.

In accordance with the aforementioned module connector, a third objective of the present disclosure is to allow the exposure or concealment of part of the cables in the connector.

In accordance with the aforementioned module connector, a fourth objective of the present disclosure is to provide a plurality of locking portions and a plurality of fastening portions in order to secure the connector to a light strip or detach the connector from the light strip for easy assembly or maintenance.

In accordance with the aforementioned module connector, a fifth objective of the present disclosure is to provide indicating holes and indicators, such that for example how the cables and the base are combined can be determined based on if the indicators are exposed from the indicating holes.

In accordance with the aforementioned module connector, a sixth objective of the present disclosure is to, based on the module connector, provide a receiving portion in the second connecting component and a transmission portion in the circuit board to electrically connect the cables to the circuit board by combining the receiving portion and the transmission portion.

In order to achieve the above and other objectives, the present disclosure provides a module connector for transmitting signals and power between a light strip and a circuit board by connecting a plurality of cables, wherein the light strip includes a plurality of first terminals and the circuit board includes a plurality of second terminals. The light source connecting module includes a first connecting component and a second connecting component. The first connecting component can be connected with the light strip and accommodating the cables. The first connecting component further includes a first base, a plurality of first conductors and a plurality of first clamping parts. The first base includes a first body, a plurality of first cable grooves, a plurality of first through holes and a plurality of third cable grooves. The first body has a first surface and a third surface. The first body forms the first cable grooves and the third cable grooves in order to accommodate the cables. The central axes of the first through holes is at a first angle with the first cable grooves and pass through the first body, and one ends of the first through holes communicate with the first cable grooves, wherein the first cable grooves and the third cable grooves are recessed from at least one of the first surface and the third surface. The first conductors are disposed in the first cable grooves, one ends of the first conductors can be connected to one ends of the cables, while the other ends of the first conductors can be connected to the first terminals. The plurality of first clamping parts are provided in at least one of the first cable grooves or the third cable grooves for securing the cables in the first cable grooves and the third cable grooves. The second connecting component can be connected with the first connecting component via the cables and can be connected with the circuit board, so as to transmit at least one of the signals and the power between the second connecting component and the circuit board.

In order to achieve the above and other objectives, the present disclosure provide a module connector for transmitting signals and power between a light strip and a circuit board by connecting a plurality of cables, wherein the light strip includes a plurality of first terminals and the circuit board includes a plurality of second terminals. The light source connecting module includes a first connecting component for connecting with the light strip and accommodating the cables. The second connecting component can be connected with the first connecting component via the cables and can be connected with the circuit board. At least one of the signals and the power is transmitted between the second connecting component and the circuit board. The second connecting component further includes a second base and a plurality of second conductors. The first base includes a second body, a plurality of second cable grooves, a plurality of fourth cable grooves and a plurality of second through holes. The second body has a second surface and a fourth surface. The second body forms the second cable grooves and the fourth cable grooves in order to accommodate the cables. The central axes of the second through holes are at a second angle with the second cable grooves and pass through the second body. One ends of the second through holes communicate with the second cable grooves, wherein the second cable grooves and the fourth cable grooves are recessed from at least one of the second surface and the fourth surface. The plurality of second conductors are disposed in the second cable grooves and the second through holes. One ends of the second conductors can be connected to the other ends of the cables, while the other ends of the first conductors can be connected to the second terminals. The plurality of second clamping parts are provided in at least one of the second cable grooves or the fourth cable grooves for securing the cables in the second cable grooves and the fourth cable grooves.

In comparison to the traditional module connectors, the module connector of the present disclosure provides different connecting units that are applicable to cables of different lengths, allowing the backlight module to be designed according to the changes in size. Moreover, the module connector of the present disclosure provides modular bridging between the cables and the light strips (e.g. LED modules) to enable easy arrangement and replacement.

DETAILED DESCRIPTION OF THE PREFERRED EMBODIMENTS

In order to fully comprehend the objectives, features and efficacy of the present invention, a detailed description is described by the following substantial embodiments in conjunction with the accompanying drawings. The description is as below.

The description of unit, element and component in the present invention uses "one", "a", or "an". The way mentioned above is for convenience, and for general meaning of the category of the present invention. Therefore, the description should be understood as "include one", "at least one", and include the singular and plural forms at the same time unless obvious meaning.

The description of comprise, have, include, contain, or another similar semantics has the non-exclusive meaning. For example, an element, structure, product, or device contain multi requirements are not limited in the list of the content, but include another inherent requirement of element, structure, product or device not explicitly listed in the content. In addition, the term "or" is inclusive meaning, and not exclusive meaning.

Figure 1A:
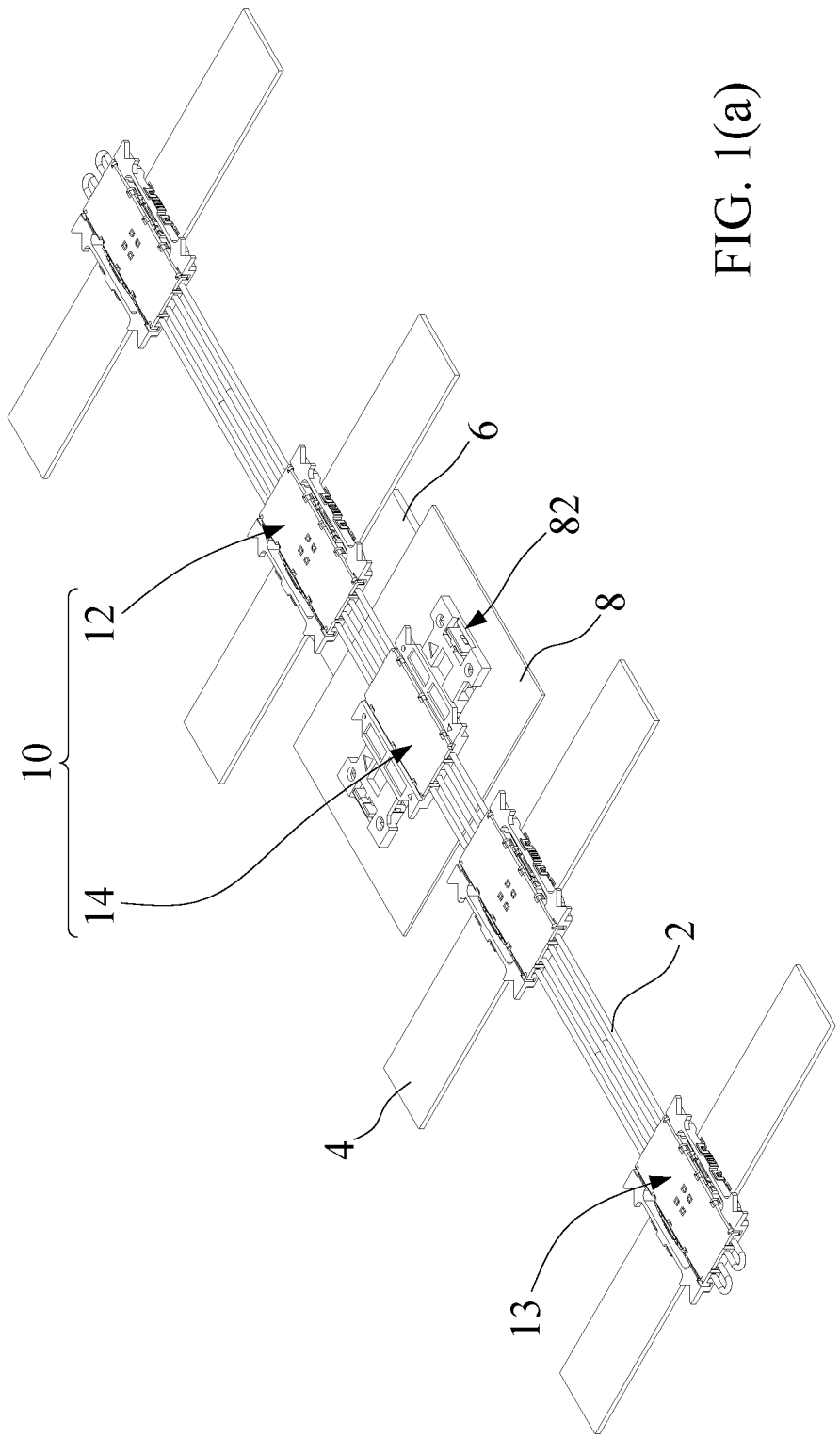
FIG. 1(a) is a front schematic perspective diagram of the module connector connected to light strips and a circuit board in accordance with the first embodiment of the present disclosure.
Figure 1B:
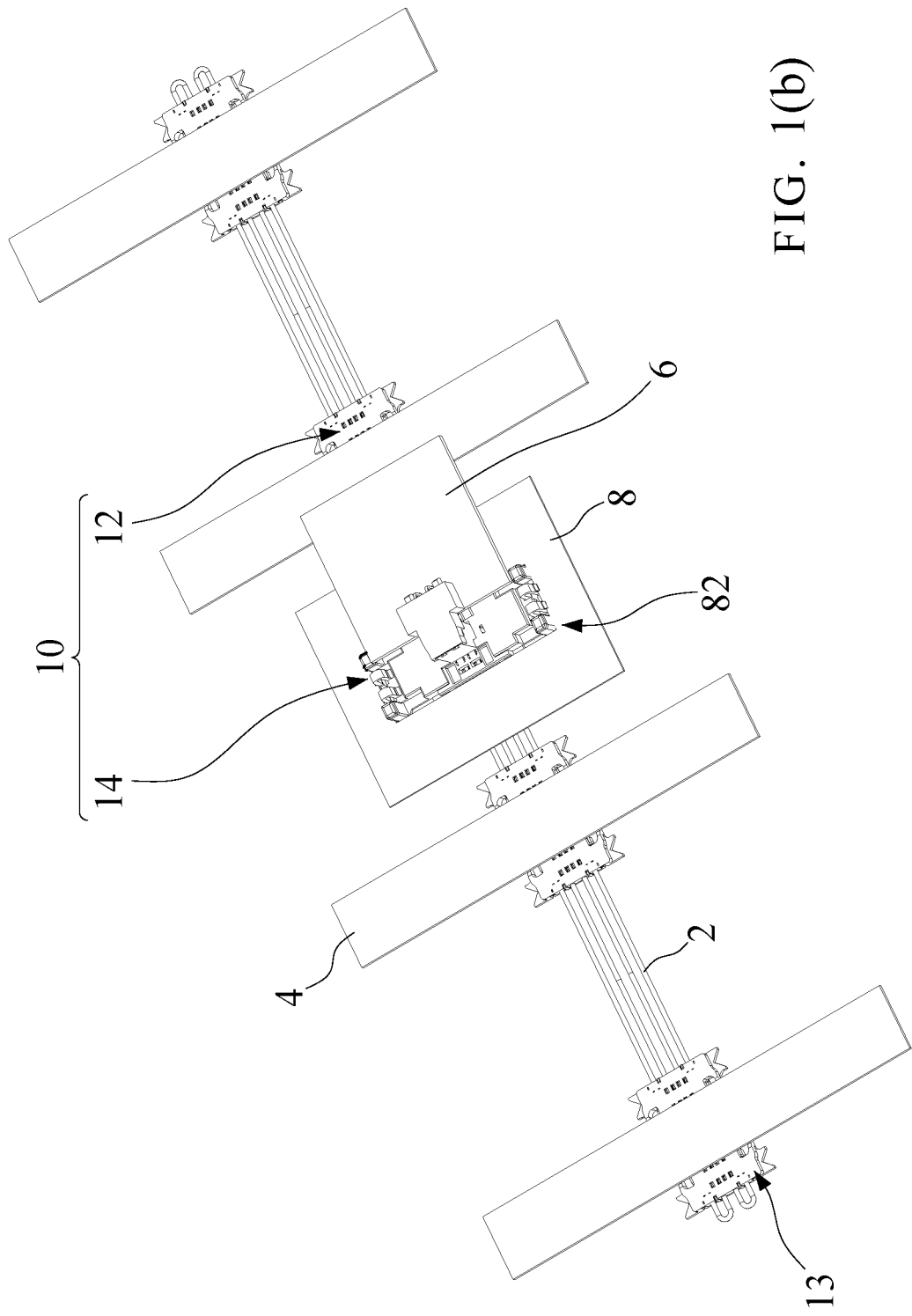
FIG. 1(b) is a back schematic perspective diagram of the module connector connected to light strips and a circuit board in accordance with the first embodiment of the present disclosure.

Referring to FIGS. 1(a) and 1(b), schematic perspective diagrams depicting a module connector connected to light strips and a circuit board in accordance with a first embodiment of the present disclosure from different perspectives are provided. FIG. 1(a) is a front schematic perspective diagram of the module connector connected to light strips and a circuit board in accordance with the first embodiment of the present disclosure, and FIG. 1(b) is a back schematic perspective diagram of the module connector connected to light strips and a circuit board in accordance with the first embodiment of the present disclosure.

In FIGS. 1(a) and 1(b), the transmissions of signals (not shown) and power (not shown) is facilitated by a module connector 10 via a plurality of cables 2 connected between light strips 4 and a circuit board 6. Herein, as an example, the number of cables 2 is illustrated as four; in other embodiments, the number of cables is not limited as such. Herein, the light strip 4 includes a plurality of first terminals 22 (referring to FIG. 8) and the circuit board 6 includes a plurality of second terminals 62 (referring to FIG. 13).

The light source connecting module 10 includes a first connecting component 12 and a second connecting component 14. Herein, as an example, the light source connecting module 10 is illustrated as being fastened to an outer case 8 having an opening 82 as an example.

Figure 2:
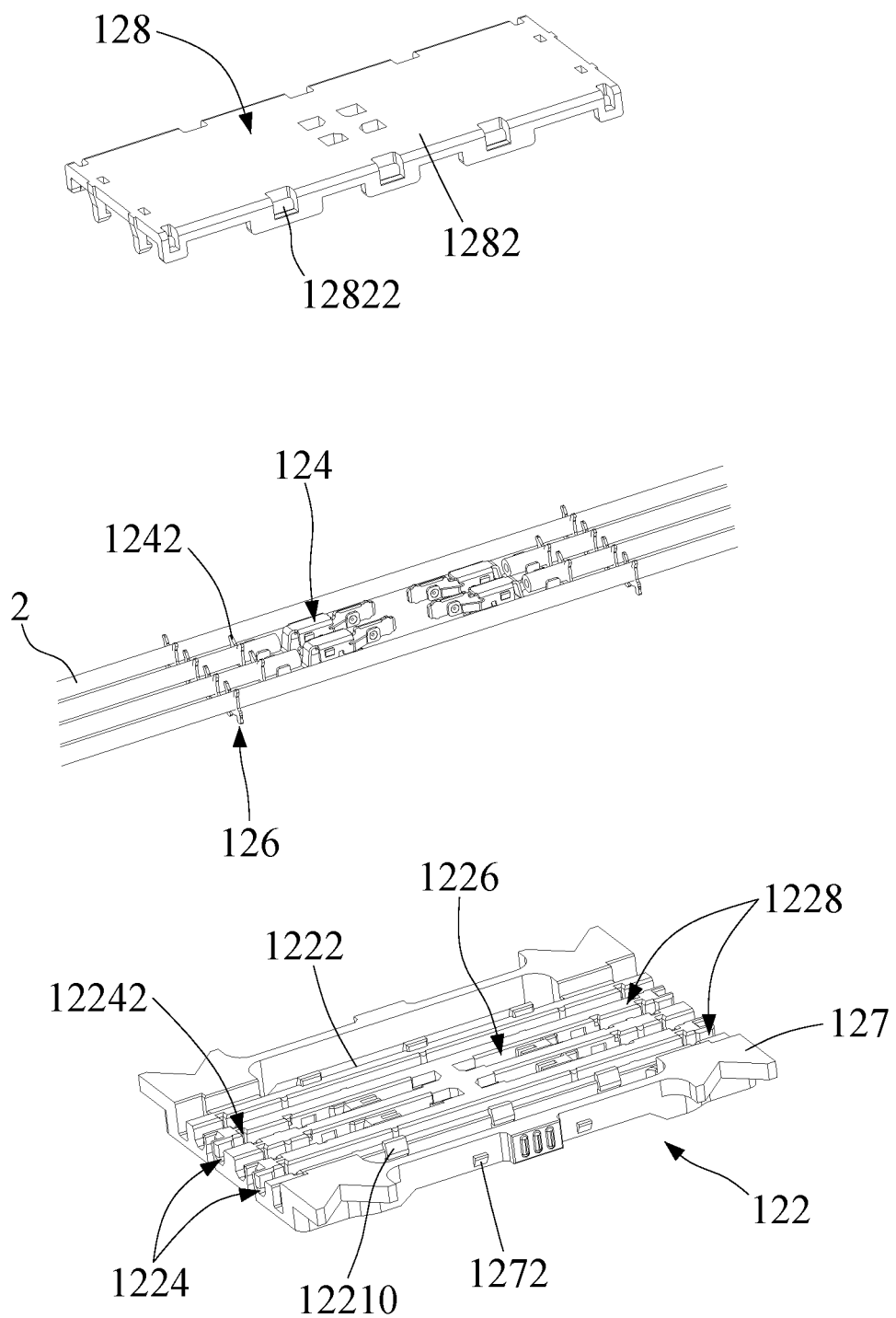
FIG. 2 simultaneously, an exploded schematic diagram depicting the first connecting component connected to the cables of FIGS. 1(a) and 1(b) in accordance with the present disclosure is provided.

Referring to FIG. 2 simultaneously, an exploded schematic diagram depicting the first connecting component connected to the cables of FIGS. 1(a) and 1(b) in accordance with the present disclosure is provided. In FIG. 2, the first connecting component 12 can be used for connecting the light strip 4 and for accommodating the cables 2 of FIGS. 1(a) and 1(b).

The first connecting component 12 further includes a first base 122, a plurality of first conductors 124 and a plurality of first clamping parts 126.

The first base 122 includes a first body 1222, a plurality of first cable grooves 1224, a plurality of first through holes 1226 and a plurality of third cable grooves 1228. The first body 1222 form the first cable grooves 1224 and the third cable grooves 1228 in order to accommodate the cables 2, wherein a plurality of first holding grooves 12242 are formed in the first cable grooves 1224. Herein, the first holding grooves 12242 can be formed at the edges of the first body 1222 or near the edges of the first body 1222.

The central axes of the first through holes 1226 are at a first angle with the first cable grooves 1224 and pass through the first body 1222, wherein the first angle is illustrated as 90 degrees as an example. One ends of the first through holes 1226 communicate with the first cable grooves 1224. In this example, the first cable grooves 1224 and the first through holes 1226 together assume L-shaped structures.

The first conductors 124 are arranged in the first cable grooves 1224. One ends of the first conductors 124 can be connected to one ends of the cables 2, while the other ends of the first conductors 124 can be connected to the first terminals 22.

The first clamping parts 126 are provided in the first holding grooves 12242 for holding the first clamping parts 126 to effectively hold the cables 2 in place.

The first connecting component 12 further includes a first lid 128 having a third body 1282 in the first cable grooves 1224. Herein, the first clamping parts 126 are illustrated as U-shaped metal components, and protruding structures are formed on the inner edges of the first clam. A plurality of fifth locking portions 12822 are formed on the periphery of the third body 1282, and the first base 122 further includes a plurality of seventh locking portions 12210. The fifth locking portions 12822 are disposed correspondingly to the seventh locking portions 12210. The fifth locking portions 12822 can be engaged with the seventh locking portions 12210 to cover the first cable grooves 1224.

Figure 3:
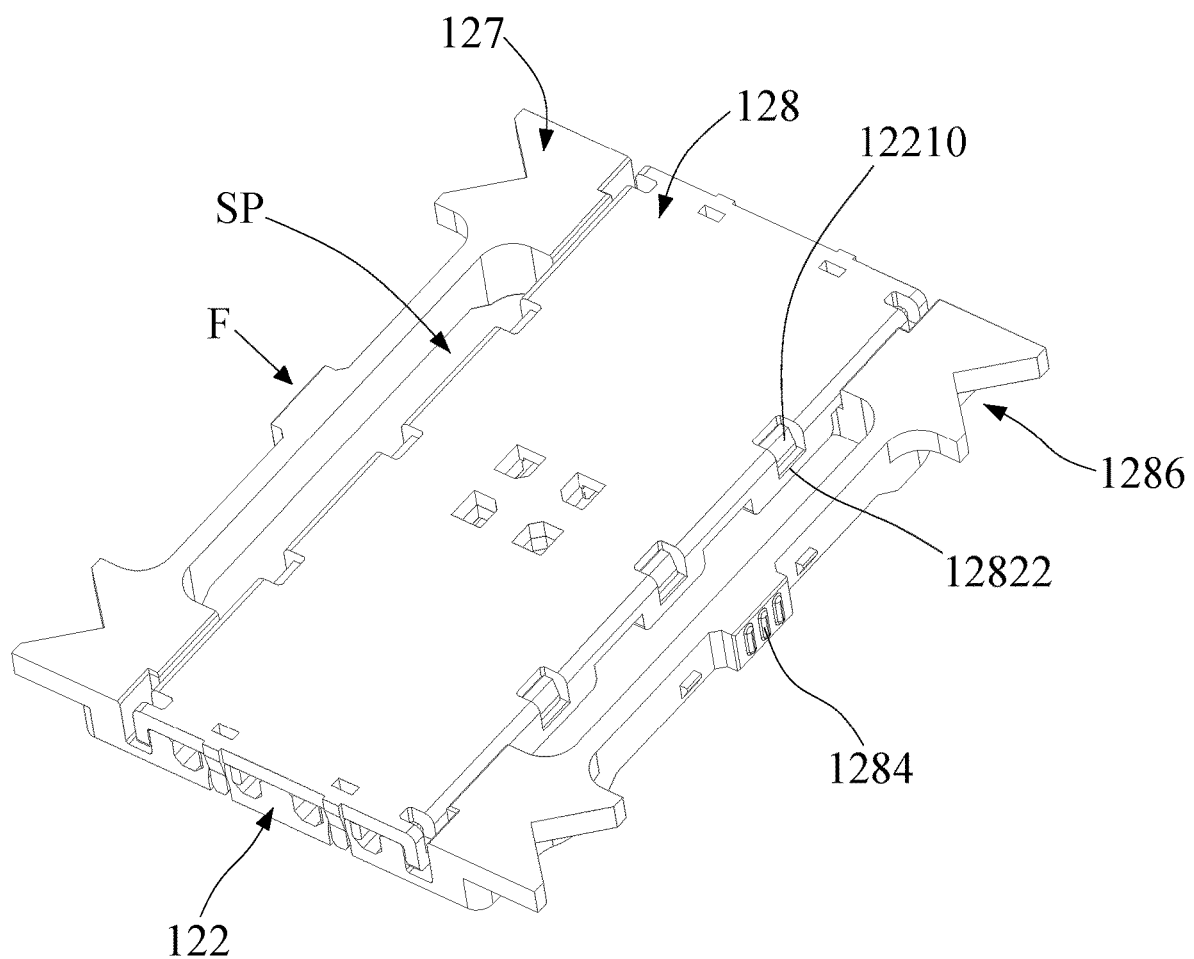
FIG. 3 is a perspective diagram depicting the assembly of the first connecting component of FIG. 2 in accordance with the present disclosure is provided.
Figure 4A:
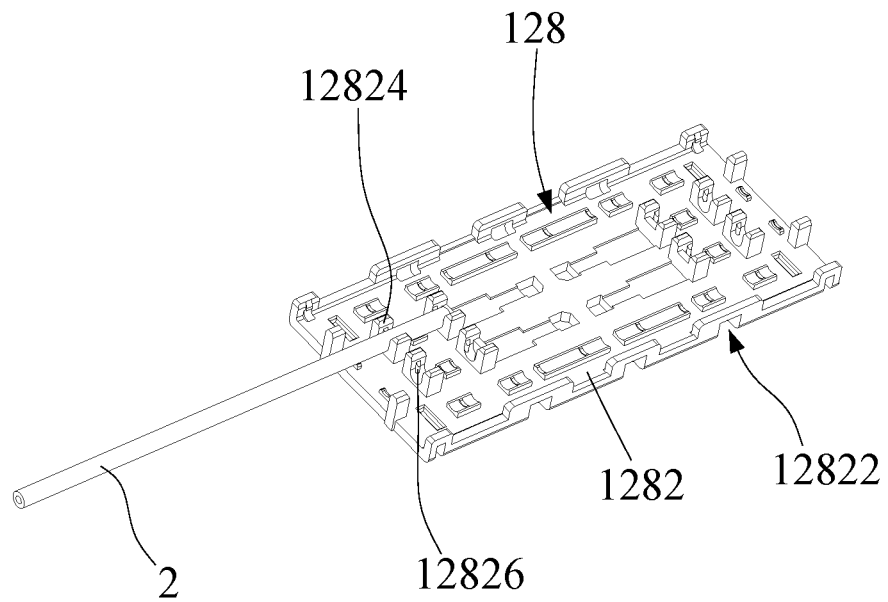
FIG. 4(a) is another schematic diagram depicting the assembly of the lid and the cables of FIG. 2 in accordance with the present disclosure is provided.
Figure 4B:
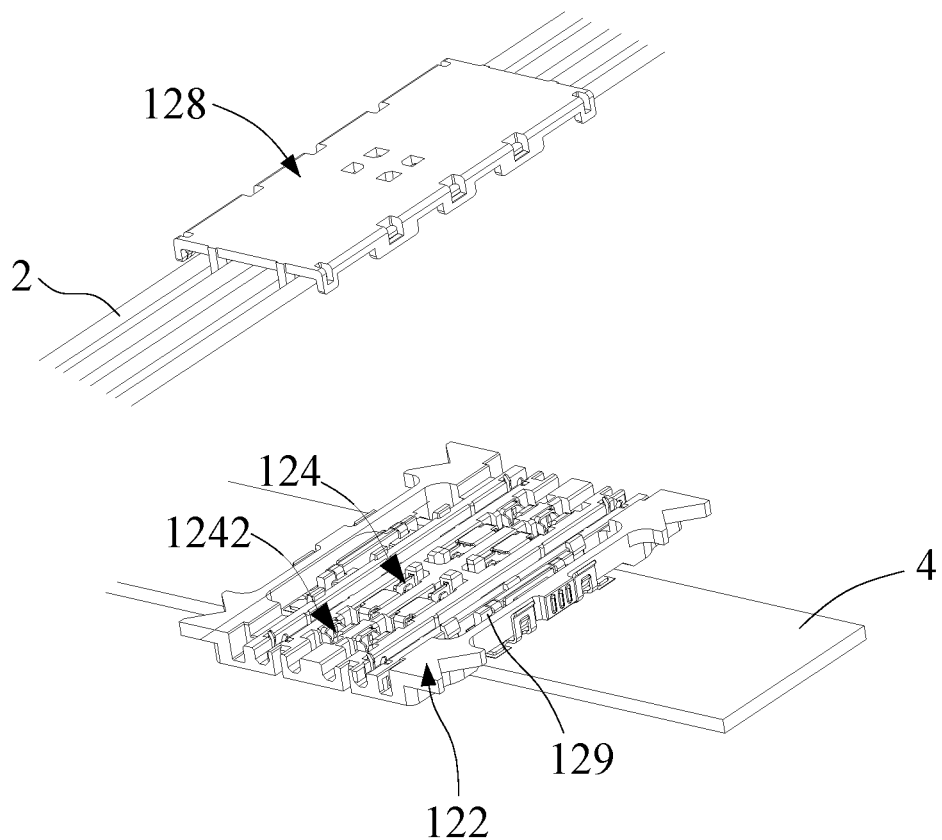
FIG. 4(b) at the same time, a schematic diagram depicting the assembly of the first lid with the first base, the first conductors and the light strip of FIG. 4(a) in accordance with the present disclosure is provided.
Figure 5:
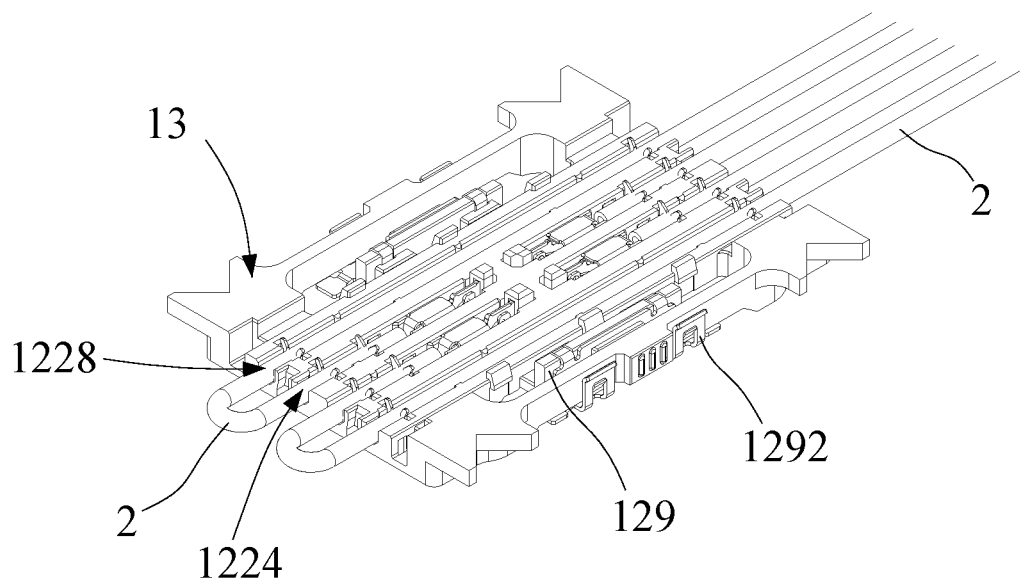
FIG. 5 is a schematic diagram depicting another embodiment of the first connecting component of FIGS. 1(a) and 1(b) in accordance with the present disclosure is provided.

The first connecting component 12 further includes a plurality of first locking portions 127 and first fastening portions 129 (referring to FIG. 4(b) or FIG. 5). Herein, the first locking portions 127 are formed on two outer sides of the first body 1222. For example, a plurality of first locking parts 1272 are formed on the first locking portions 127 as securing structures. For example, the first locking parts 1272 are illustrated as bumps. Furthermore, the first fastening portions 129 are provided on the light strip 4, and a plurality of fastening parts 1292 are formed on the first fastening portions 129 (referring to FIG. 5) such that they corresponding to the first locking parts 1272. By engaging the first fastening parts 1292 with the first locking parts 1272, the first connecting component 12 can be secured on the light strip 4. Referring to FIG. 3 at the same time, a perspective diagram depicting the assembly of the first connecting component of FIG. 2 in accordance with the present disclosure is provided. Moreover, the first locking portions 127 and the first body 1222 form a plurality of deformation space SP. The first locking portions 127 have a plurality of first pressing portions 1284. By applying an external force F, the first pressing portions 1284 change the shapes of the deformation space SP, allowing the first locking parts 1272 to be detached from the first fastening parts 1292. It should be noted that, for easy mechanical assembly, V-shaped holding portions 1286 can be formed on the first locking portions 127. Moreover, in another embodiment, part of the first pressing portions 1284 can be formed in the deformation space SP.

Returning to FIG. 2, the first connecting component 12 and the cables 2 are assembled by first placing the cables 2 in the first cable grooves 1224 and the third cable grooves 1228. After the cables 2 are arranged in the first body 1222, the first lid 128 is placed thereon to cover the cables 2. In another embodiment, referring to FIG. 4(a) at the same time, another schematic diagram depicting the assembly of the lid and the cables of FIG. 2 in accordance with the present disclosure is provided. In FIG. 4(a), the first lid 128 further includes a plurality of cable fasteners 12824. The cable fasteners 12824 are formed on the third body 1282 and corresponding to the first cable grooves 1224. By combining the first lid 128 and the first base 122, the cables 2 can be positioned in the first cable grooves 1224 and at one ends of the first conductors 124. In still another embodiment, limit blocks 12826 can be further included for holding the cables securely in the first cable grooves 1224. Referring to FIG. 4(b) at the same time, a schematic diagram depicting the assembly of the first lid with the first base, the first conductors and the light strip of FIG. 4(a) in accordance with the present disclosure is provided. Herein, conductor clamping parts 1242 are formed on one ends of the first conductors 124 for clamping the cables 2 and electrically connecting the conductors (not shown) inside the cables 2. These conductors are, for example, copper wires encased in the cables 2.

Returning back to FIG. 1(a), in addition to the first connecting component 12 not located at the end of the module connector 10 described above, the diagram further illustrates a first connecting component 13 located at the end of the module connector 10. The first connecting component 13 allows at least one of the cables 2 to be simultaneously arranged in the first cable grooves 1224 and the third cable grooves 1228, thereby forming an electrical circuit as can be seen in FIG. 5, which is a schematic diagram depicting another embodiment of the first connecting component of FIGS. 1(a) and 1(b) in accordance with the present disclosure is provided.

Figure 6:
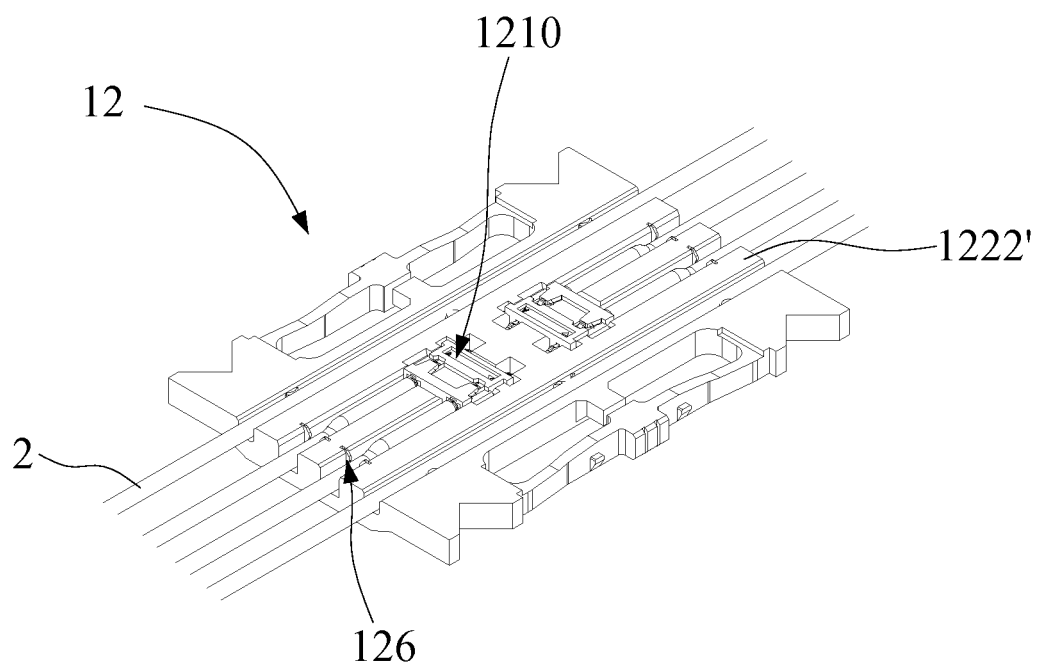
FIG. 6 shows another embodiment of the first connecting component in accordance with the present disclosure.
Figure 7:
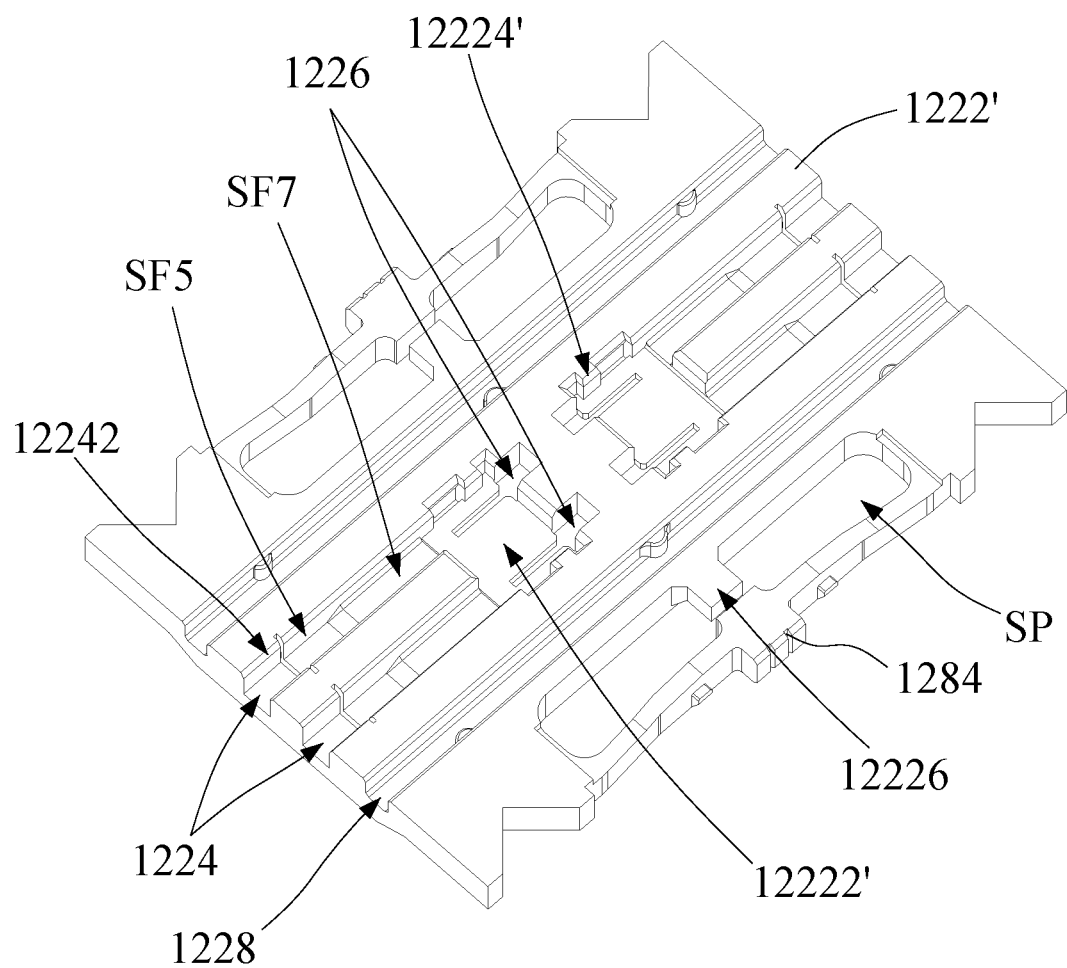
FIG. 7 is a schematic diagram depicting another embodiment of the first base of the first connecting component in accordance with the present disclosure.

It should be noted that the first lid 128 is an optional structure. In other embodiments, the first lid 128 can be omitted. Referring to FIG. 6 in conjunction with FIG. 7, FIG. 6 shows another embodiment of the first connecting component in accordance with the present disclosure, and FIG. 7 is a schematic diagram depicting another embodiment of the first base of the first connecting component in accordance with the present disclosure.

The first connecting component 12 herein includes similarly the first base 122, the first body 1222, the first cable grooves 1224, the first through holes 1226 and the third cable grooves 1228 as those described in connection to the first connecting component 12 above, except a different way of connecting the cables 2. In this embodiment, the first connecting component 12 further includes a plurality of first cable assembly 1210, a plurality of first assembly notches 12222' is further formed in a first body 1222'. The first cable assembly 1210 are disposed correspondingly to the first assembly notches 12222'. The first cable assembly 1210 can connect one ends of at least two cables 2, and the first assembly notches 12222' communicate with at least two of the first cable grooves 1224 and at least two of the first through holes 1226. Third fastening parts 12224' are formed on the first assembly notches 12222' for fastening the first cable assembly 1210 in the first assembly notches 12222'.

Figure 8:
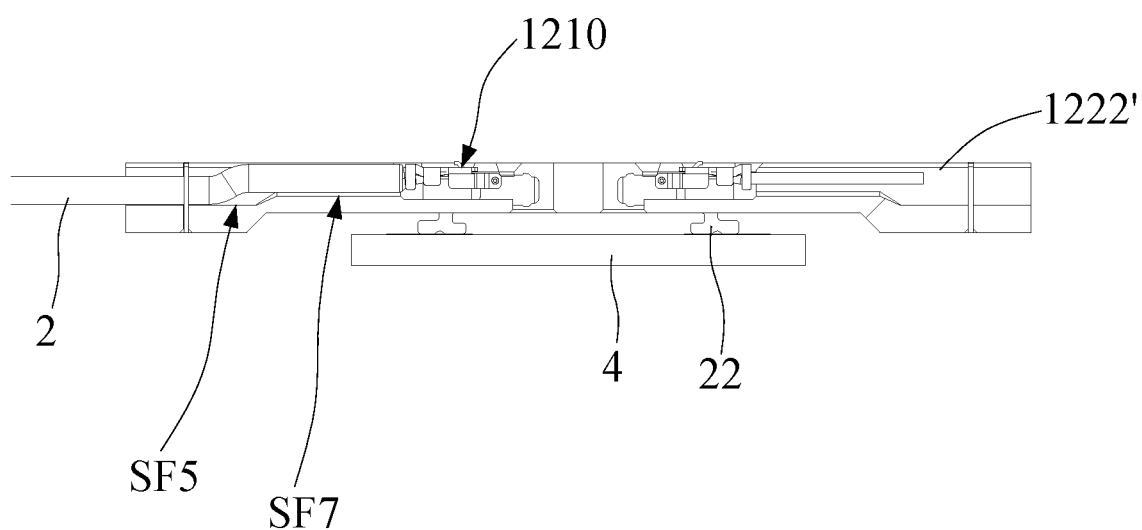
FIG. 8 is a cross-section schematic diagram depicting cables assembled with the first connecting component of FIG. 6 in accordance with the present disclosure provided.

Referring to FIG. 8 at the same time, a cross-section schematic diagram depicting cables assembled with the first connecting component of FIG. 6 in accordance with the present disclosure is provided. As can be seen in FIGS. 7 and 8, the first cable grooves 1224 has a plurality of fifth surfaces SF5 and a plurality of seventh surfaces SF7. There is a difference in level between the fifth surface SF5 and the seventh surface SF7, thereby making a bend in the cable 2. Furthermore, the first body 1222' further includes first limiters 12226 formed in the deformation space SP to control the amount of shape deformation created as a result of the first pressing portions 1284 acting upon the deformation space SP.

Figure 9:
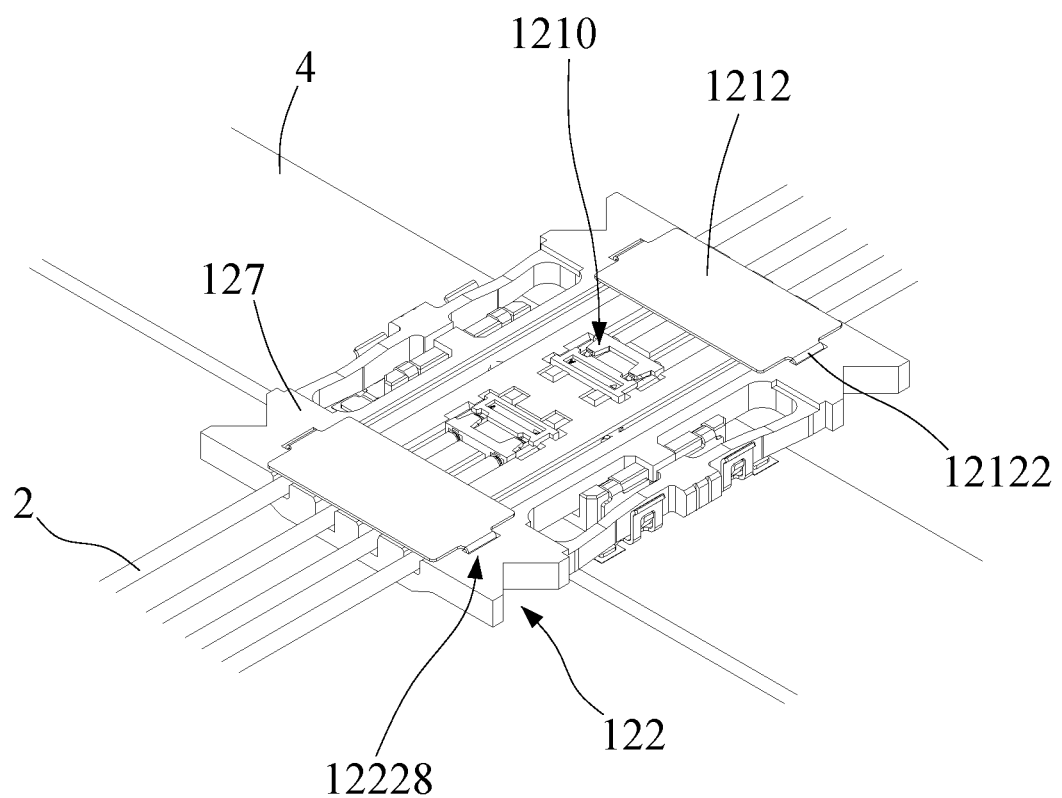
FIG. 9 is a schematic diagram depicting yet another embodiment of the first connecting component combined with a light strip in accordance with the present disclosure is provided.

Moreover, in addition to the previous embodiment in which the first lid 128 is not required, there is yet another embodiment. Referring to FIG. 9, a schematic diagram depicting yet another embodiment of the first connecting component combined with a light strip in accordance with the present disclosure is provided.

The light source connecting module 10 further includes a third lid 1212 having a plurality of tabs 12122, and the first locking portions further include a plurality of blind holes 12228. The first tabs 12122 are disposed correspondingly to the first blind holes 12228 for covering portions of the first cable grooves 1224 and the third cable grooves 1228.

Returning to FIG. 1(a), the second connecting component 14 can be connected to the first connecting component 12 via the cables 2 and can be connected to the circuit board 6, such that at least one of signals and power can be transmitted between the second connecting component 14 and the circuit board 6.

Figure 10:
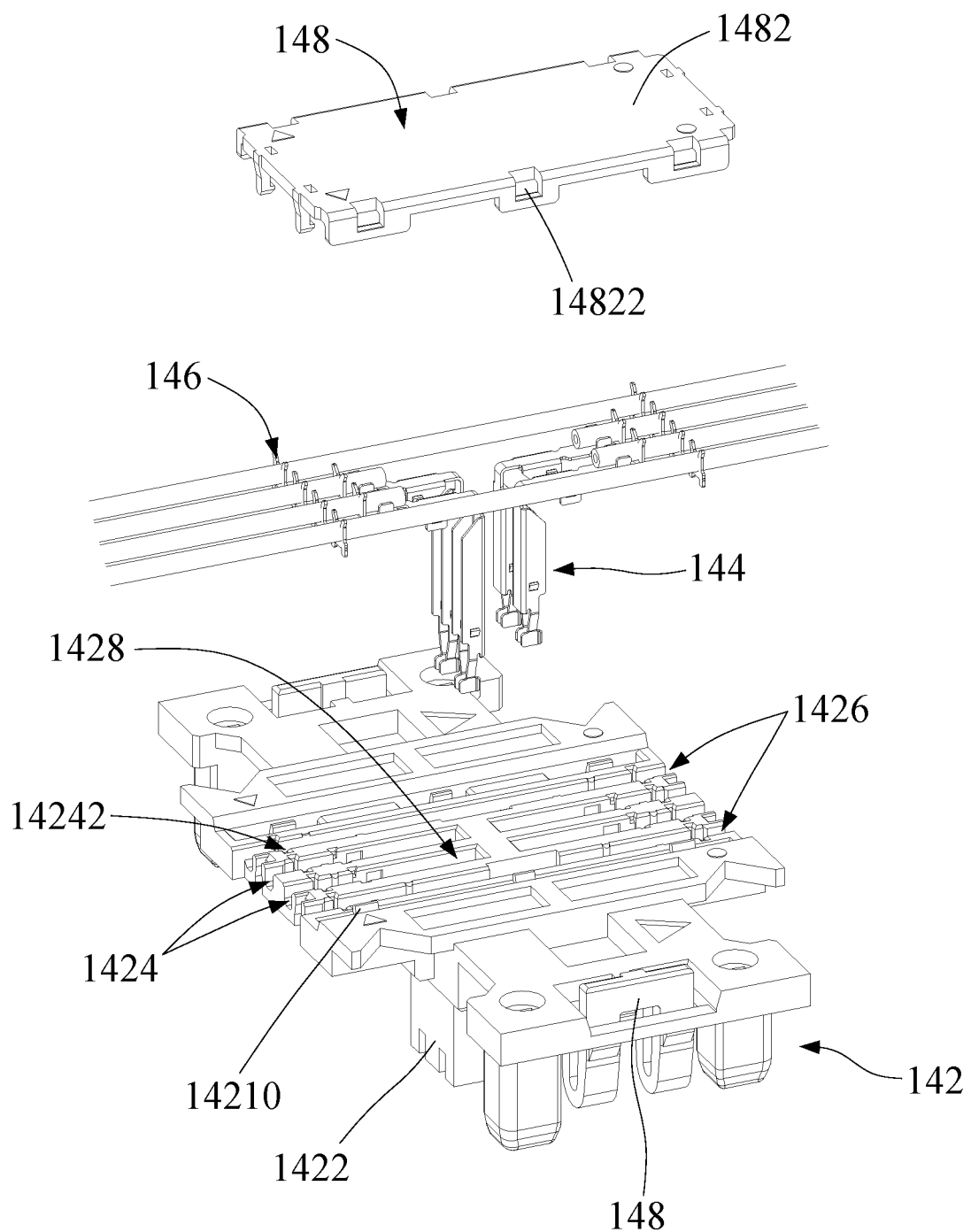
FIG. 10 is an exploded schematic diagram depicting the second connecting component connected with the cables of FIGS. 1(a) and 1(b) in accordance with the present disclosure is provided.

Referring to FIG. 10, an exploded schematic diagram depicting the second connecting component connected with the cables of FIGS. 1(a) and 1(b) in accordance with the present disclosure is provided. In FIG. 10, the second connecting component 14 can be connected to the first connecting component 12 via the cables 2 and can be connected to the circuit board 6, such that at least one of signals and power can be transmitted between the second connecting component 14 and the circuit board 6.

The second connecting component 14 further includes a second base 142, a plurality of second conductors 144 and a plurality of second clamping parts 146.

The second base 142 includes a second body 1422, a plurality of second cable grooves 1424, a plurality of fourth cable grooves 1426 and a plurality of second through holes 1428.

The second body 1422 form the second cable grooves 1424 and the fourth cable grooves 1426 for accommodating the cables 2. The second cable grooves 1424 form a plurality of second holding grooves 14242. The central axes of the second through holes 1428 are at a second angle with the second cable grooves 1424 and pass through the second body 1422. Here, the second angle is illustrated as 90 degrees, for example. Furthermore, one ends of the second through holes 1428 communicate with the second cable grooves 1424.

The second conductors 144 are arranged in the second cable grooves 1424 and the second through holes 1428. One ends of the second conductors 144 can be connected to the other ends of the cables 2, while the other ends of the second conductors 144 can be connected to the second terminals 62.

The second clamping parts 146 are positioned in the second holding grooves 14242 for securing the cables 2 in the second cable grooves 1424. Herein, the second holding grooves 14242 are formed at edges of the second body 1422 or near the edges of the second body 1422.

Herein, the second connecting component 14 further includes a plurality of elastic parts 1484 formed on two sides of the second body 1422 for securing the second connecting component 14 to, for example, the outer case 8 having the opening 82 shown in FIG. 1(a).

Moreover, the second connecting component 14 further includes a second lid 148 having a fourth body 1482. A plurality of fourth locking portions 12822 are formed on the periphery of the fourth body 1482, and the second base further includes a plurality of sixth locking portions 14210. The fourth locking portions 14822 are disposed correspondingly to the sixth locking portions 14210. Once the fourth locking portions 14822 and the sixth locking portions 14210 are engaged, the second cable grooves 1424 can be concealed.

Figure 11:
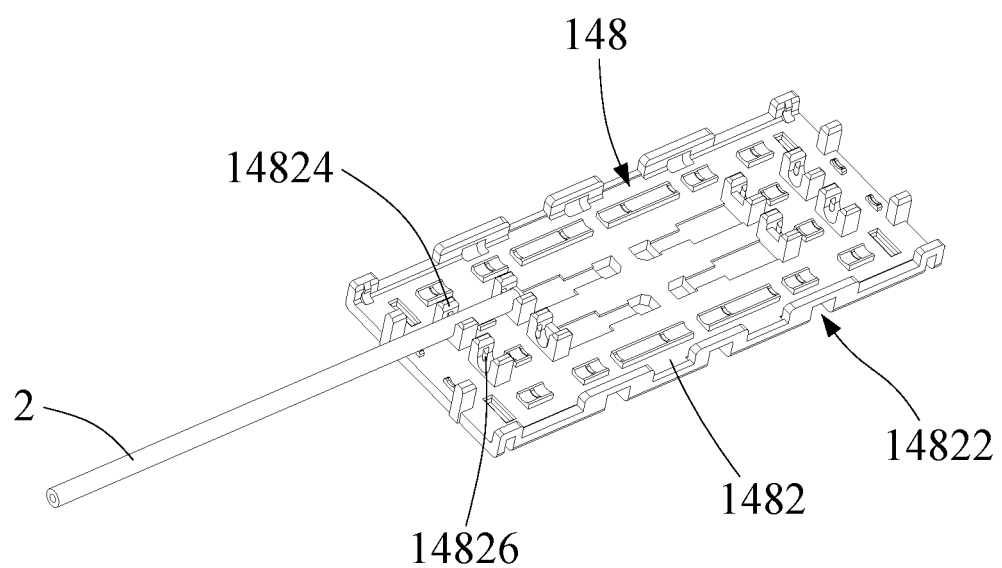
FIG. 11 is a schematic diagram depicting another embodiment of the second lid of FIG. 10 in accordance with the present disclosure is provided.

Referring to FIG. 11 at the same time, a schematic diagram depicting another embodiment of the second lid of FIG. 10 in accordance with the present disclosure is provided. In FIG. 11, the second lid 148 further includes a plurality of second cable fasteners 14824. The second cable fasteners 14824 are formed on the fourth body 1482 and arranged correspondingly to the second cable grooves 1424. By engaging the second lid 148 with the second base 142, the cables 2 can be arranged in the second cable grooves 1424 at the ends where the second conductors 144 are located (i.e. the ends where the second clamping parts 1442 are formed, which will be described later) In another embodiment, limit blocks 14826 can also be provided to secure the cables in the second cable grooves 1424.

Figure 12:
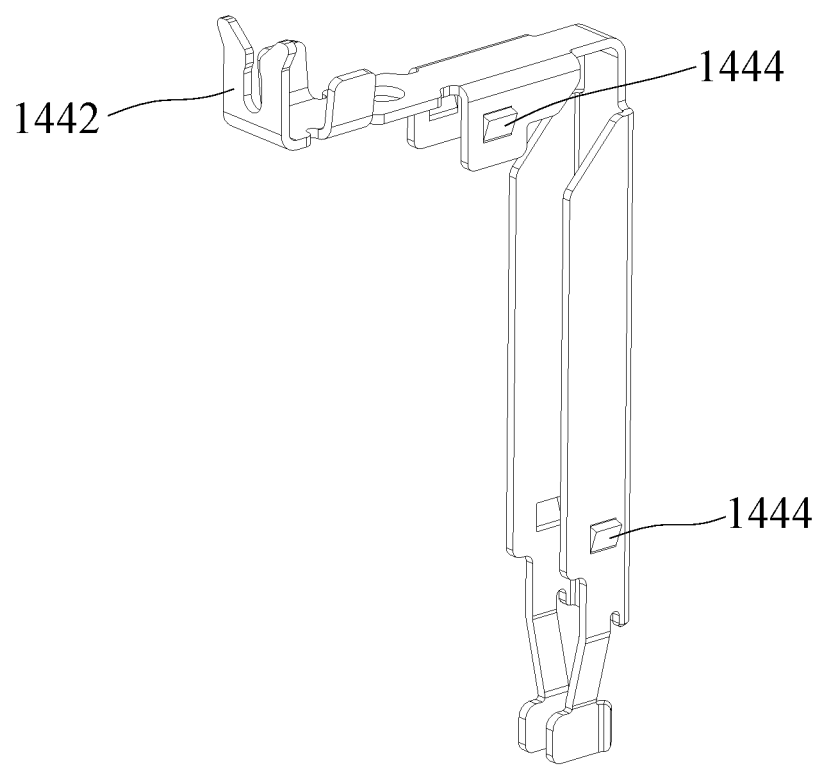
FIG. 12 is a schematic perspective diagram depicting the second conductors of FIG. 10 in accordance with the present disclosure is provided.

Referring to FIG. 12 at the same time, a schematic perspective diagram depicting the second conductors of FIG. 10 in accordance with the present disclosure is provided. In FIG. 12, the second conductors 144 are illustrated as L-shaped structures as an example. Second clamping parts 1442 are formed at one ends of the second conductors 144 for holding the cables in place as well as electrically connecting to the conductors (not shown) inside the cables 2, wherein the ends of the second conductors can be sheet-like or clamping structures. In yet another embodiment, second limiters 1444 are formed on the outer edges of the second conductors 144 for securing to the second through holes 1428.

Figure 13:
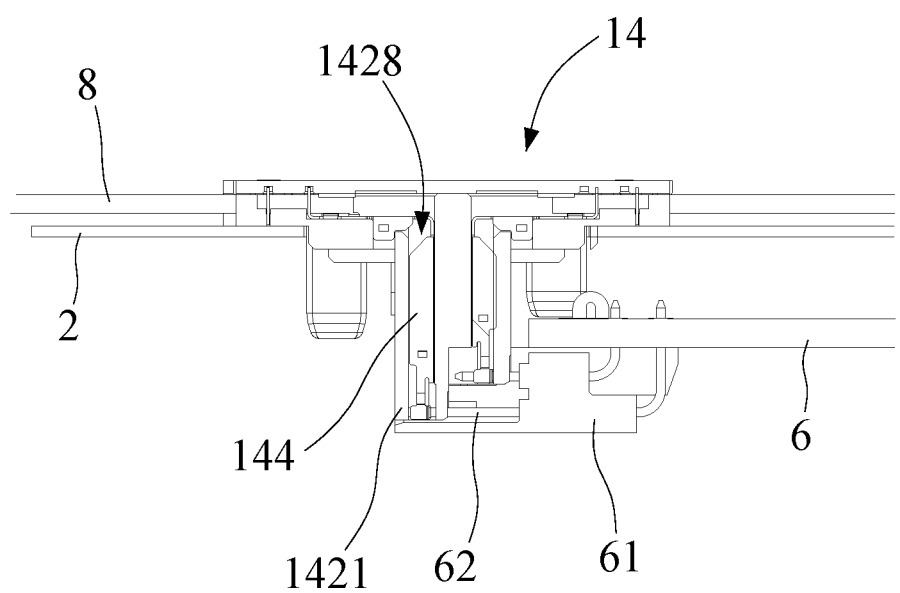
FIG. 13 is a cross-section diagram depicting the second connecting component of FIG. 10 in accordance with the present disclosure is provided.
Figure 14:
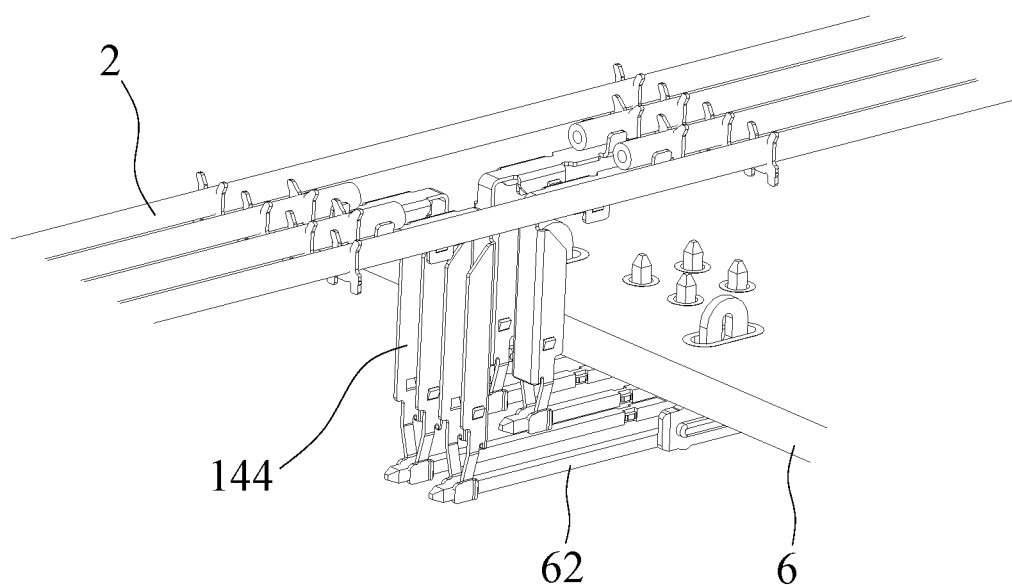
FIG. 14 is a schematic diagram illustrating the connections between the second conductors, the cables and the second terminals of FIG. 13 in accordance with the present disclosure.

Referring to FIG. 13 at the same time, a cross-section diagram depicting the second connecting component of FIG. 10 in accordance with the present disclosure is provided. In FIG. 13, the second conductors 144 are inserted into the second through holes 1428, thereby enabling connection with the second terminals 62 of the circuit board 6. In addition, an external compound 61 can be additionally provided on the second terminals 62, and a first connecting compound 1421 can be additionally provided on the second body 1422. Connection can be ascertained through the external compound 61 and the first connecting compound 1421. For example, in FIG. 13, the external compound 61 extends horizontally from right to left of the drawing to enable vertical connection. Moreover, the way in which the second conductors 144, the cables 2 and the second terminals 62 are connected can be seen from FIG. 14, which is a schematic diagram illustrating the connections between the second conductors, the cables and the second terminals of FIG. 13 in accordance with the present disclosure.

Figure 15:
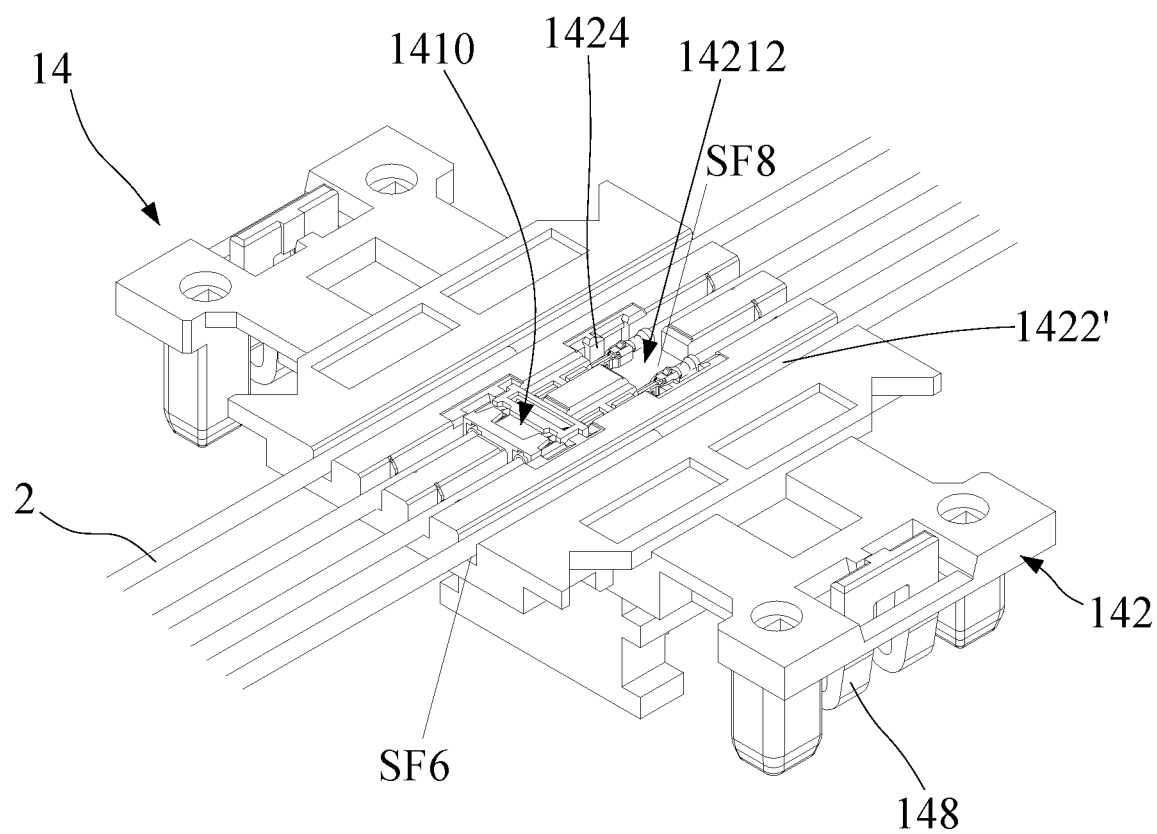
FIG. 15 is a schematic diagram depicting the engagement of the second connecting component and the cables of FIG. 10 in accordance with the present disclosure is shown.

Referring to FIG. 15, a schematic diagram depicting the engagement of the second connecting component and the cables of FIG. 10 in accordance with the present disclosure is shown. In FIG. 15, the second connecting component 14 further includes a plurality of second cable assembly 1410, and a plurality of second assembly notches 14212 is further formed in a second body 1422'. The second cable assembly 1410 are arranged correspondingly to the second assembly notches 14212. The second cable assembly 1410 can be connected to one ends of at least two of the cables 2, and the second assembly notches 14212 communicate with at least two of the second cable grooves 1424 and at least two of the second through holes 1428. Moreover, second locking portions 1424 are formed in the second assembly notches 14212 for securing the second cable assembly 1410 in the second assembly notches 14212. In addition, the second cable grooves 14212 have a plurality of sixth surfaces SF6 and a plurality of eighth surfaces SF8. The descriptions of which can be found by referring to the same structures described above. According to the descriptions in the previous embodiment, the difference in level between the sixth surfaces SF6 and the eighth surfaces SF8 results in bends in the cables 2.

Figure 16:
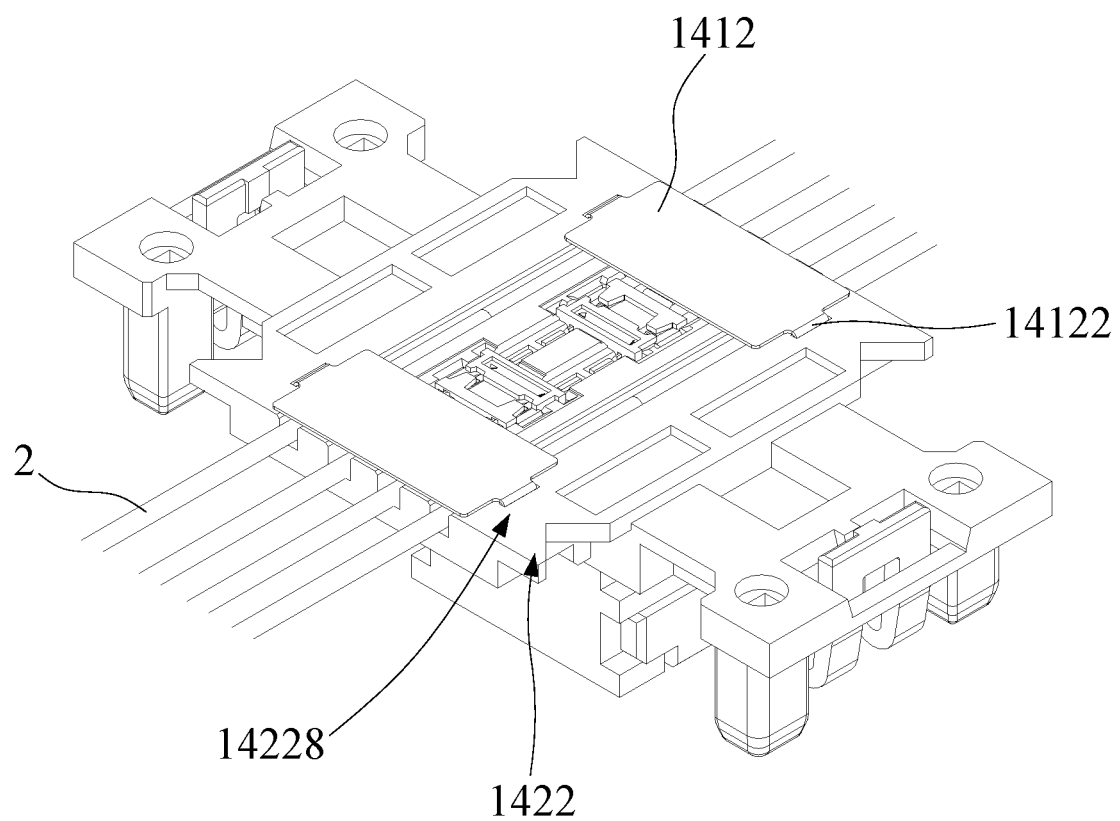
FIG. 16, a schematic diagram depicting another embodiment of the second connecting component in accordance with the present disclosure is provided.

In addition to the previous embodiment where the second lid 148 is not required for the second connecting component 14, there is yet another embodiment. Referring to FIG. 16, a schematic diagram depicting another embodiment of the second connecting component in accordance with the present disclosure is provided.

The light source connecting module 10 further includes a fourth lid 1412 having a plurality of second tabs 14122, and the second body 1422 further includes a plurality of blind holes 14228. The second tabs 14122 are arranged correspondingly to the second blind holes 14228 for covering portions of the second cable grooves 1424 and the fourth cable grooves 1426.

Figure 17:
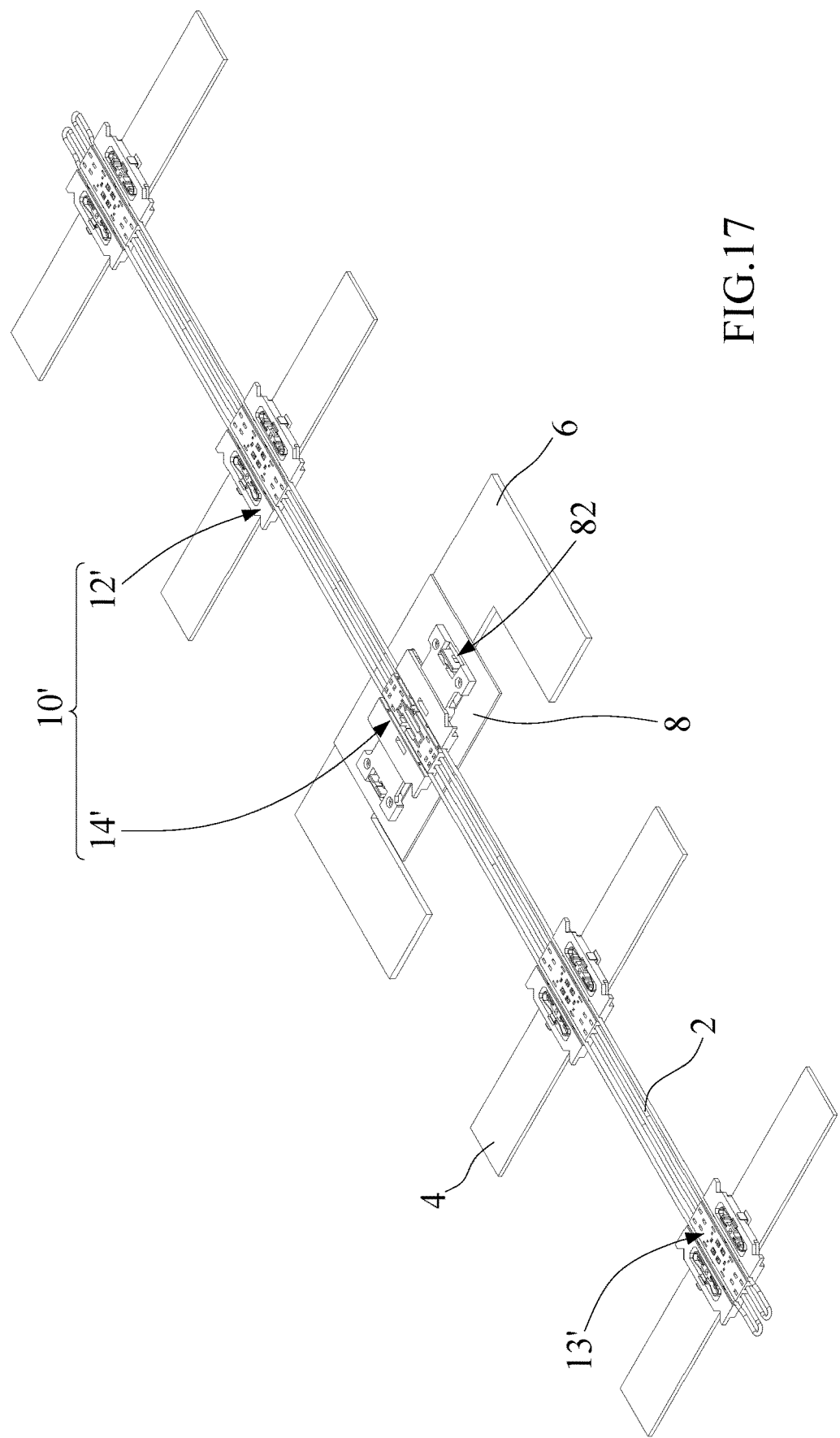
FIG. 17, a front schematic perspective diagram depicting a module connector connected to light strips and a circuit board in accordance with a second embodiment of the present disclosure is provided.

Referring to FIG. 17, a front schematic perspective diagram depicting a module connector connected to light strips and a circuit board in accordance with a second embodiment of the present disclosure is provided. In FIG. 17, the transmission of signals and power is similarly facilitated by a module connector 10' via a plurality of cables 2 connected between a light strip 4 and a circuit board 6, wherein the cables 2, the light strip 4 and the circuit board 6 are similar to those described above and descriptions thereof will not be repeated.

The light source connecting module 10' includes a first connecting component 12' and a second connecting component 14'. Herein, as an example, the light source connecting module 10' is secured to an outer case 8 having an opening 82.

Figure 18A:
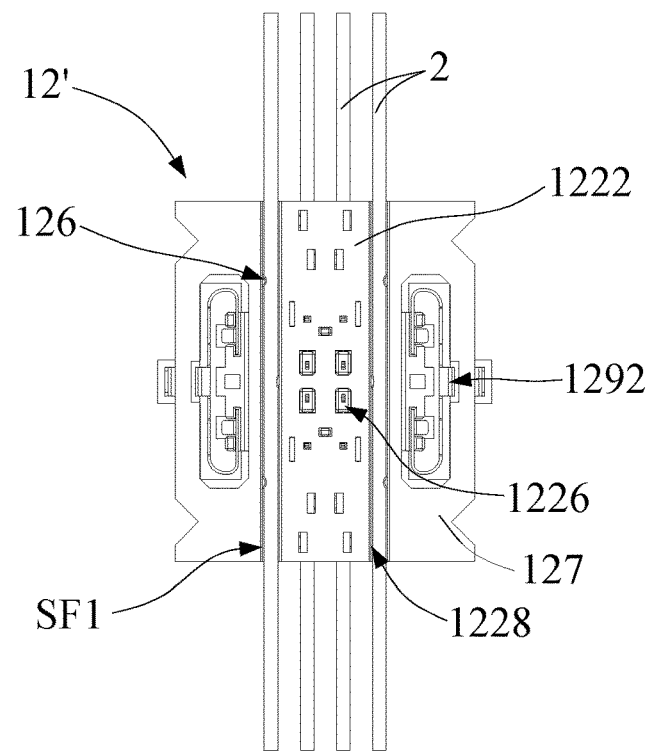
FIG. 18(a) is a front schematic perspective diagram of the first connecting component connected to the cables of FIG. 17 in accordance with the present disclosure.
Figure 18B:
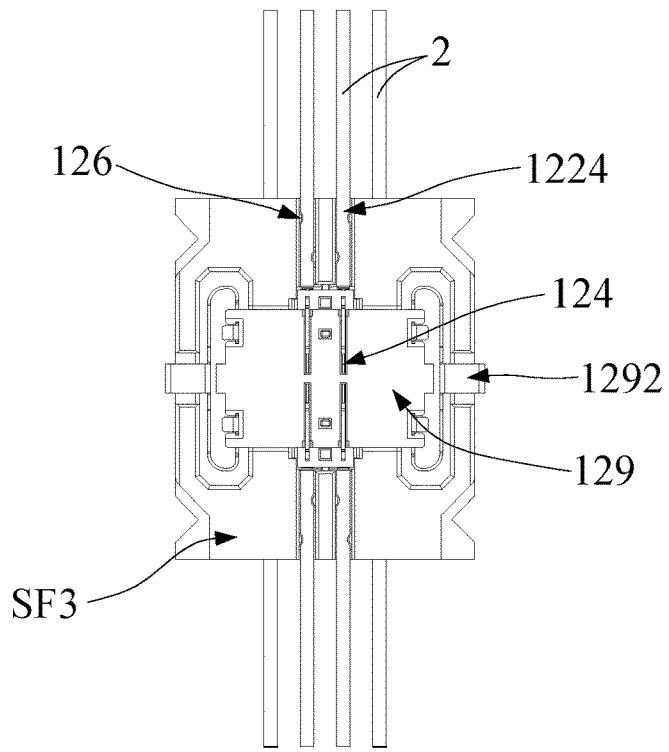
FIG. 18(b) is a back schematic perspective diagram of the first connecting component connected to the cables of FIG. 17 in accordance with the present disclosure.

Referring to FIG. 18(*a*) in conjunction with FIG. 18(*b*), schematic diagrams depicting the first connecting component connected to the cables of FIG. 17 in accordance with the present disclosure in different perspectives are provided. FIG. 18(*a*) is a front schematic perspective diagram of the first connecting component connected to the cables of FIG. 17 in accordance with the present disclosure, and FIG. 18(*b*) is a back schematic perspective diagram of the first connecting component connected to the cables of FIG. 17 in accordance with the present disclosure. The present embodiment is different from the first embodiment mainly in that, the two cables 2 located at the inner side and the two cables 2 located at the outer side of the plurality of cables 2 are on different surfaces (or the same side). In other words, take FIG. 18(*a*) as an example, only the two outer cables 2 are exposed from the first connecting component 12' while the two inner cables 2 are concealed from the view.

The first connecting component 12' further includes a first base 122, a plurality of first conductors 124 and a plurality of first clamping parts 126.

Figure 19A:
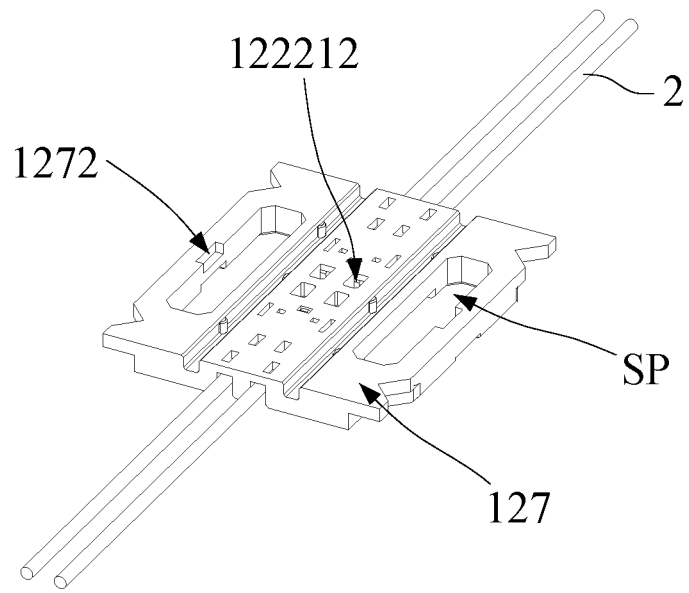
FIG. 19(a) is a schematic front view of the connecting cable of the first connecting element of FIG. 17 of the present invention, respectively.
Figure 19B:
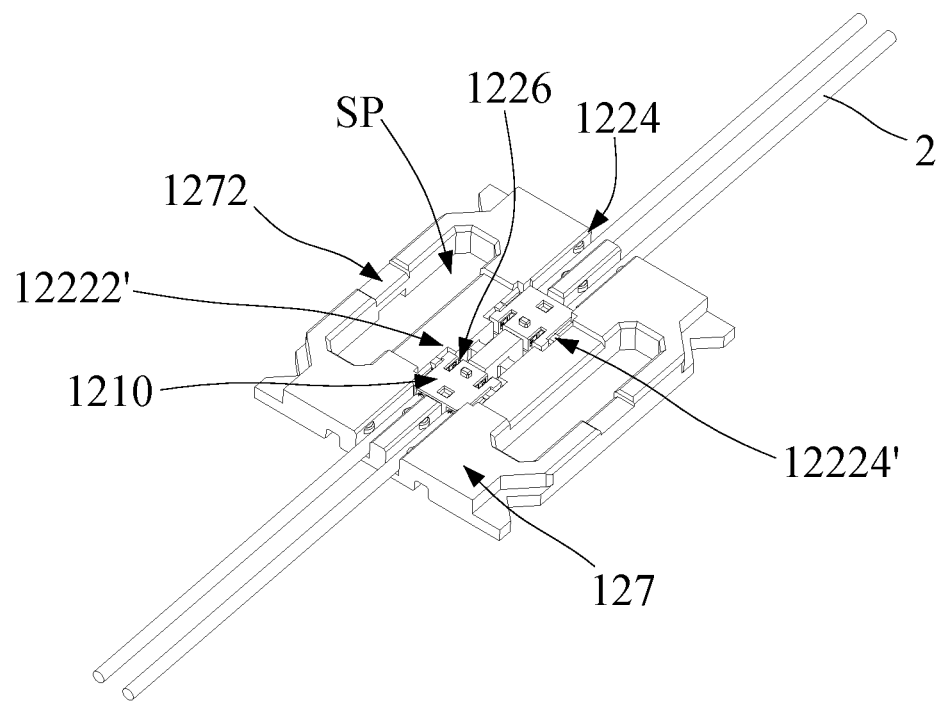
FIG. 19(b) is a schematic diagram of a rear view of the connecting cable of the first connecting element of FIG. 17 of the present invention, respectively.

The first base 122 includes a first body 1222, a plurality of first cable grooves 1224, a plurality of first through holes 1226 and a plurality of third cable grooves 1228. The first body 1222 has a first surface SF1 and a third surface SF3. The first body 1222 forms the first cable grooves 1224 and the third cable grooves 1228 in order to accommodate the cables 2. Referring to FIGS. 19(*a*) and (*b*) at the same time, front and back schematic diagrams depicting the first connecting component connected to the cables of FIG. 17 in accordance with the present disclosure are provided, respectively.

The first connecting component 12' further includes a plurality of first locking portions 127 and a plurality of first fastening portions 129. The first locking portions 127 and the first body 1222 form a plurality of deformation space SP. The first locking portions 127 can form a plurality of first locking parts 1272 on at least one of an inner side and an outer side of the deformation space SP. Herein, as an example, the first locking parts 1272 are formed on an inner side of the deformation space SP, and the descriptions of the first locking parts forming on an outer side of the deformation space SP can be found in the first embodiment. Moreover, the first fastening portions 129 form a plurality of fastening parts 1292. The locking parts 1272 are arranged correspondingly to the first fastening parts 1292, wherein the first fastening portions 127 are fastened to the light strip 4 by engaging the first locking parts 1272 with the first fastening parts 1292, thereby securing the first connecting component 12' to the light strip 4.

Figure 20:
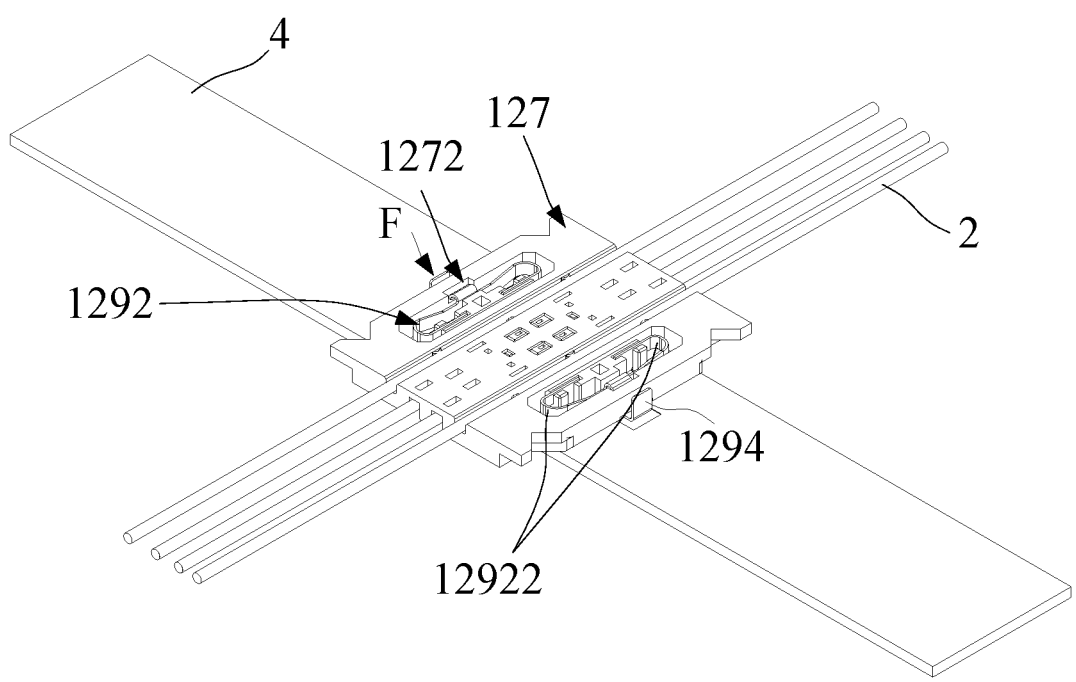
FIG. 20 is a perspective schematic diagram depicting the first connecting component connected to the cables of FIG. 17 in accordance with the present disclosure is provided.

Referring to FIG. 20, a perspective schematic diagram depicting the first connecting component connected to the cables of FIG. 17 in accordance with the present disclosure is provided. The first fastening parts 1292 may be, for example, ring-shaped structures, groove structures, elastic pressing structures or the like. In this embodiment, the first fastening parts 1292 are illustrated as elastic pressing structures as an example. The elastic pressing structures have double U-shaped long arms 12922. Moreover, the first fastening parts 129 are provided with a plurality of first fastening parts 1292 having a plurality of third pressing portions 1294. By applying an external force F, the third pressing portions 1294 change the shapes of the first fastening parts 1292, allowing the first locking parts 1272 to be disengaged from the first fastening parts 1292.

Figure 22:
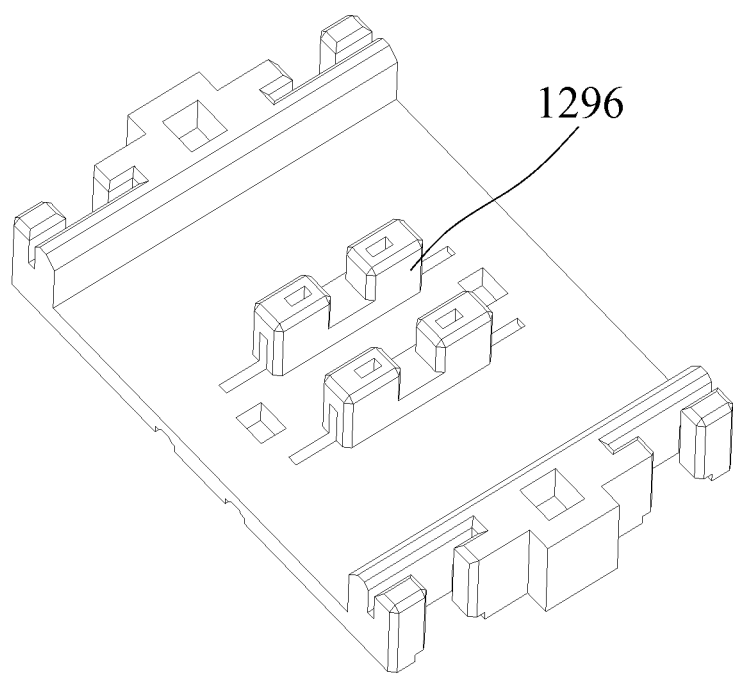
FIG. 22 is a schematic perspective diagram illustrating the first fastening portions of FIG. 18(b) in accordance with the present disclosure.
Figure 23:
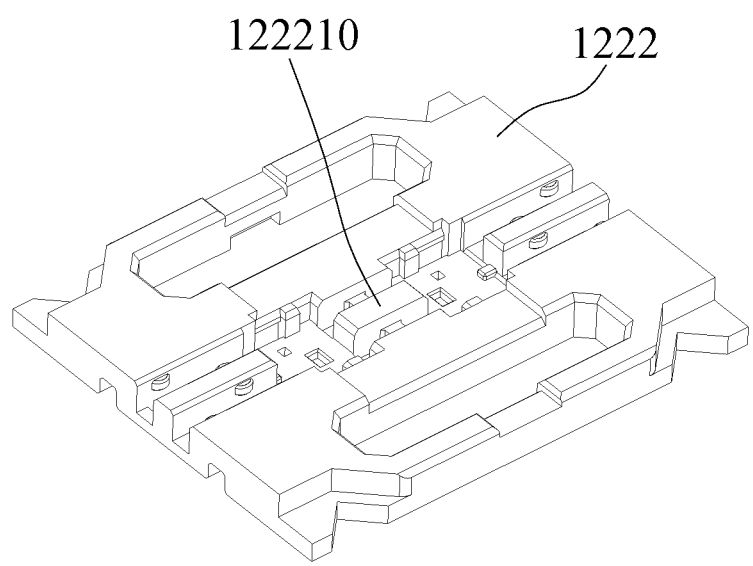
FIG. 23 is a schematic perspective diagram illustrating the first body and the first clamping parts of FIG. 18(b) in accordance with the present disclosure.

In still another embodiment, referring to FIG. 22 in conjunction with FIG. 23, FIG. 22 is a schematic perspective diagram illustrating the first fastening portions of FIG. 18(*b*) in accordance with the present disclosure, and FIG. 23 is a schematic perspective diagram illustrating the first body and the first clamping parts of FIG. 18(*b*) in accordance with the present disclosure. In FIGS. 22 and 23, the first body 1222 further includes first guiding parts 122210, and the first fastening portion 129 further includes third guiding parts 1296. The first guiding parts 122210 are disposed correspondingly to the third guiding parts 1296.

Referring to FIG. 18(*b*) in conjunction with FIG. 19(*b*), the central axes of the first through holes 1226 are at a first angle with the first cable grooves 1224 and pass through the first body 1222. Herein, the first angle is 90 degrees as an example. One ends of the first through holes 1226 communicate with the first cable grooves 1224. It should be noted that the first cable grooves 1224 and the third cable grooves 1228 are recessed from the first surface SF1 and the third surface SF3, respectively.

The first conductors 124 are provided in the first cable grooves 1224. One ends of the first conductors 1224 can be connected to one ends of the cables, while the other ends of the first conductors 124 can be connected to the first terminals 22, such as those shown in FIG. 8.

Figure 21:
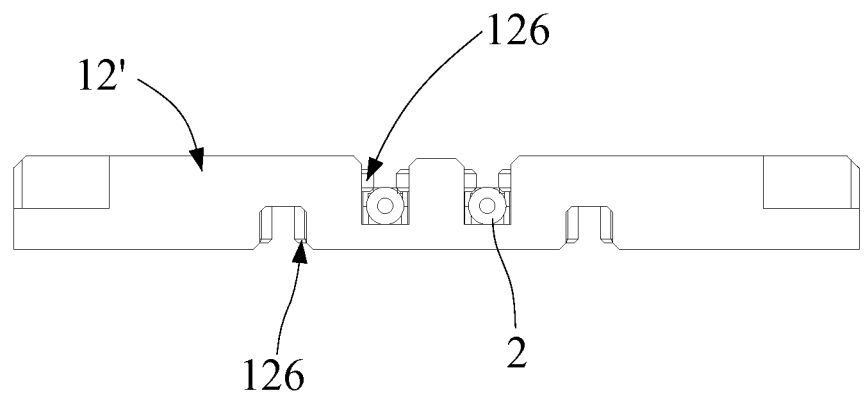
FIG. 21 is a cross-section diagram depicting the first clamping parts of FIG. 18(a) that are holding the cables in place in accordance with the present disclosure.

The first clamping parts 126 are provided in the first cable grooves 1224 and/or the third cable grooves 1228 for holding the cables 2 in place in the first cable grooves 1224 and the third cable grooves 1228. Herein, the first clamping parts 126 are, for example, illustrated as bumps as seen in FIG. 21, which is a cross-section diagram depicting the first clamping parts of FIG. 18(*a*) that are holding the cables in place in accordance with the present disclosure.

Figure 24:
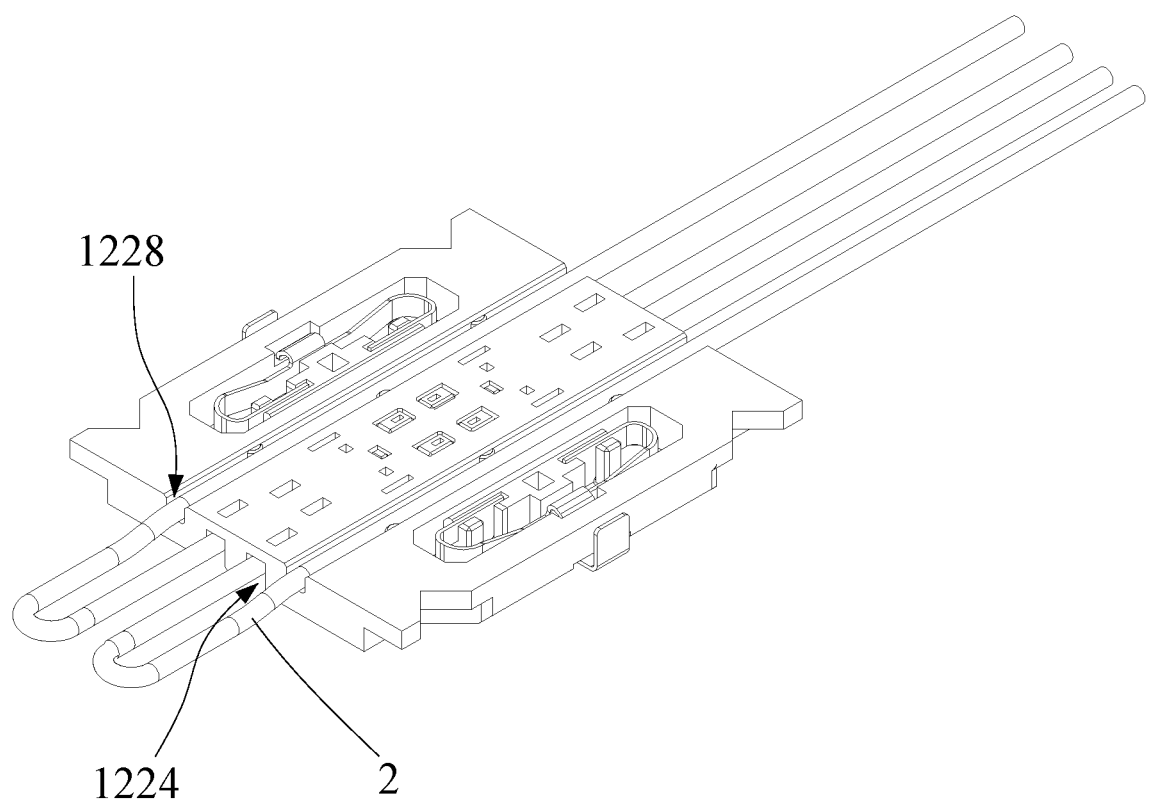
FIG. 24 is a schematic diagram depicting another embodiment of the first connecting component of FIG. 17 in accordance with the present disclosure.

Returning back to FIG. 17, in addition to the first connecting component 12' not located at the end of the module connector 10', the diagram further includes a first connecting component 13' located at the end of the module connector 10'. In the first connecting component 13', at least one of the cables 2 is arranged in both the first cable groove 1224 and the third cable groove 1228, thereby forming an electrical circuit. Referring to FIG. 24, which is a schematic diagram depicting another embodiment of the first connecting component of FIG. 17 in accordance with the present disclosure. It should be noted that the cables originally located in the third cable grooves 1228 are now bent to be on the same side as the first cable grooves 1224. In other words, one cable 2 is arranged in both the first cable groove 1224 and the third cable groove 1228.

Figure 25:
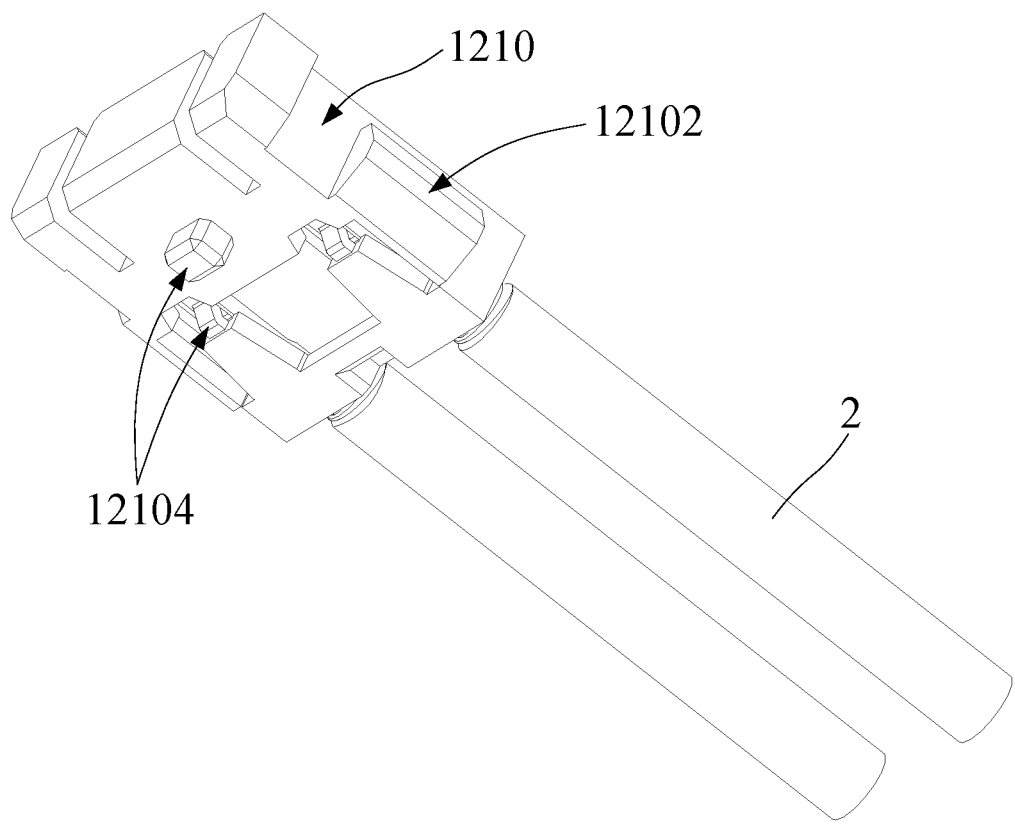
FIG. 25 is a perspective schematic diagram illustrating the first cable assembly of FIG. 19(b) in accordance with the present disclosure.

Returning to FIG. 19(*b*), the module connector 10' further includes a plurality of first cable assembly 1210, and the first body 1222 further forms a plurality of first assembly notches 12222'. Referring to FIG. 25 in conjunction, which is a perspective schematic diagram illustrating the first cable assembly of FIG. 19(*b*) in accordance with the present disclosure. The first cable assembly 1210 are arranged correspondingly to the first assembly notches 12222'. The first cable assembly 1210 can be connected to one ends of at least two of the cables 2. The first assembly notches 12222' communicate with at least two of the first cable grooves 1224 and at least two of the first through holes 1226, wherein the first assembly notches 12222' are recessed from at least one of the first surface SF1 and the third surface SF3 for communicating with the first cable grooves 1224 or the third cable grooves 1228. Furthermore, a plurality of third locking parts 12102 are formed on the first cable assembly 1210, and third fastening parts 12224' are formed on the first assembly notches 12222' so as to fasten the first cable assembly 1210 in the first assembly notches 12222'. Returning back to FIG. 19(*a*), in another embodiment, the first body 1222 further includes a plurality of first indicating holes 122212, and a plurality of first indicators 12104 are formed on the first cable assembly 1210. The first indicating holes 122212 are disposed correspondingly to the first indicators 12104. Based on the first indicators 12104 shown in the first indicating holes 122212, one can determine how the first cable assembly 1210 and the cables are assembled in the first assembly notches 12222'. Moreover, in addition to being used for indication, the first indicators 12104 can be used to prevent wrong assembly, wherein the first indicators 12104 may be ribs, indentations or the like.

Figure 26:
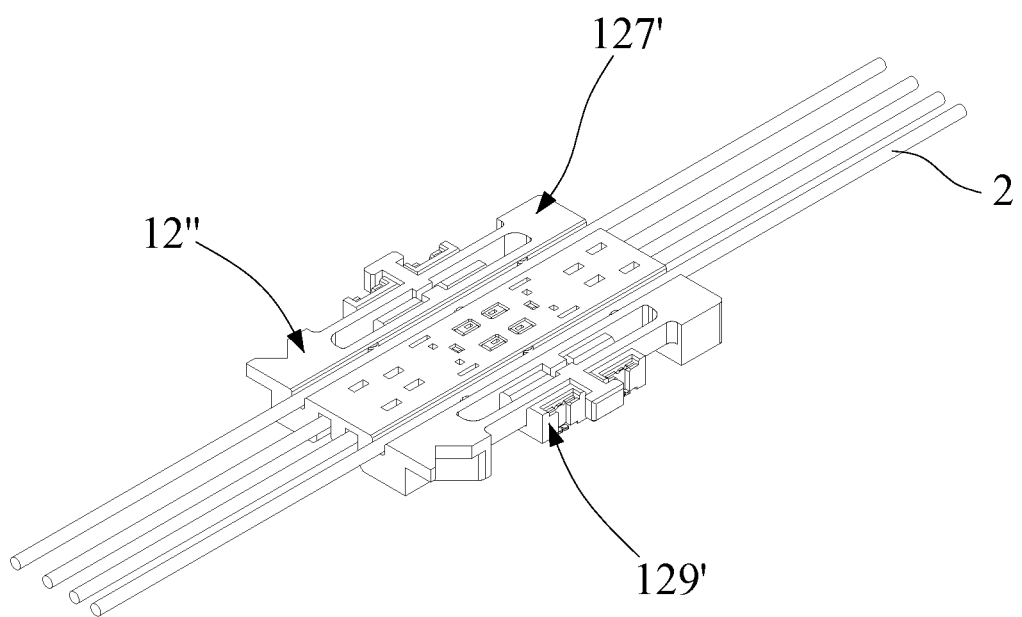
FIG. 26 is a front schematic perspective diagram depicting a module connector that can be connected to a light strip and a circuit board in accordance with a third embodiment of the present disclosure.
Figure 27A:
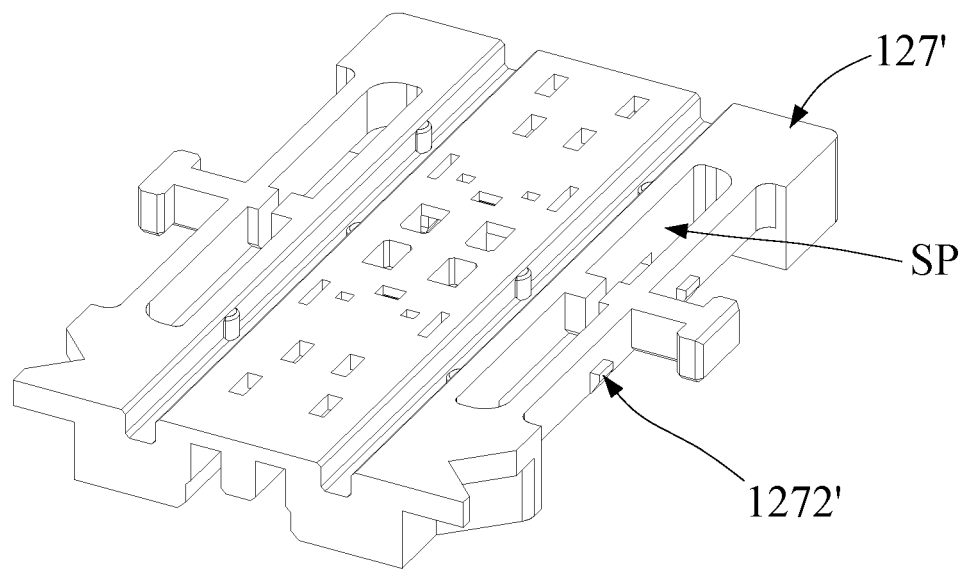
FIG. 27(a) in conjunction, which is a schematic perspective diagram illustrating the first connecting component of FIG. 26 in accordance with the present disclosure.
Figure 27B:
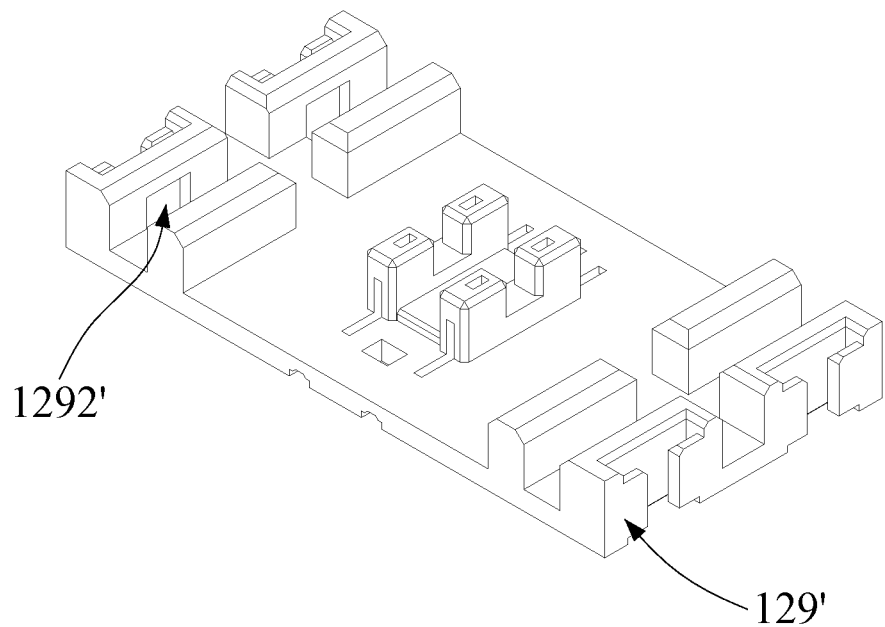
FIG. 27(b) is a schematic perspective diagram illustrating the first fastening portion of FIG. 26 in accordance with the present disclosure.

FIG. 26 is a front schematic perspective diagram depicting a module connector that can be connected to a light strip and a circuit board in accordance with a third embodiment of the present disclosure. In FIG. 26, the first connecting component 12" includes structures such as the first base, the first conductors and the first clamping parts similar to those described in the previous embodiments. The first connecting component 12" is different in the structures of the first locking portions 127' and the first fastening portions 129'. Referring to FIG. 27(*a*) in conjunction, which is a schematic perspective diagram illustrating the first connecting component of FIG. 26 in accordance with the present disclosure, and FIG. 27(*b*) is a schematic perspective diagram illustrating the first fastening portion of FIG. 26 in accordance with the present disclosure. In FIG. 27(*b*), the first locking portions 127' and the first body 1222 form a plurality of deformation space SP. The first locking portions 127' have a plurality of first locking parts 1272' on the outer side of the deformation space SP. Furthermore, a plurality of first fastening parts 1292' are formed on the first fastening portions 129', and the first locking parts 1272' are disposed correspondingly to the first fastening parts 1292'. Herein the first fastening parts 1292' are illustrated as indentations as an example, wherein the first fastening portions 127' are secured to the light strip 4 by engaging the first locking parts 1272' with the first fastening parts 1292', thereby allowing the first connecting component 12' to be fastened to the light strip 4.

Figure 28:
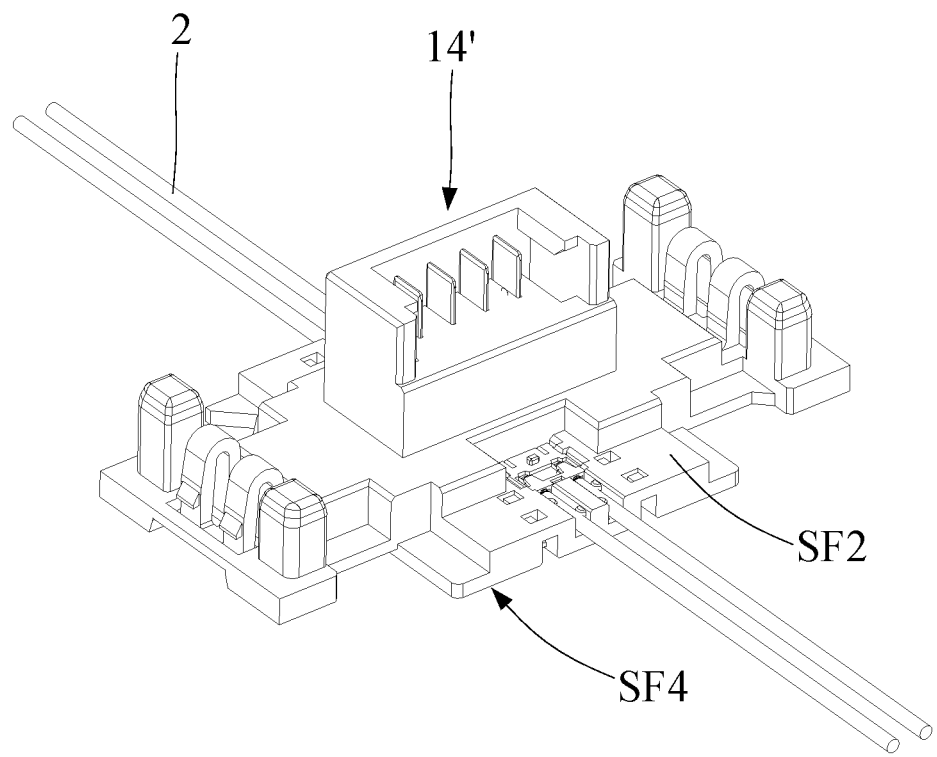
FIG. 28 is a schematic perspective diagram depicting the second connecting component of FIG. 17 connected to the cables in accordance with the present disclosure.
Figure 29A:
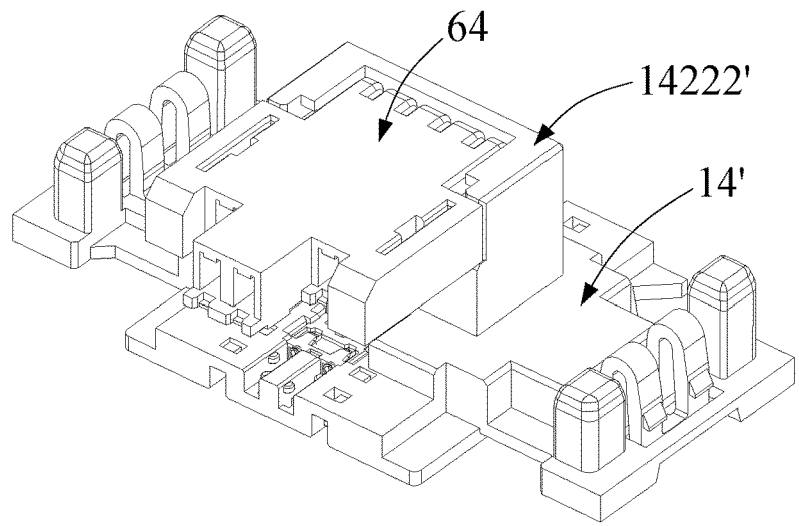
FIG. 29(a) is a schematic perspective diagram illustrating the second connecting component of FIG. 28 combined with a transmission portion in accordance with the present disclosure.
Figure 29B:
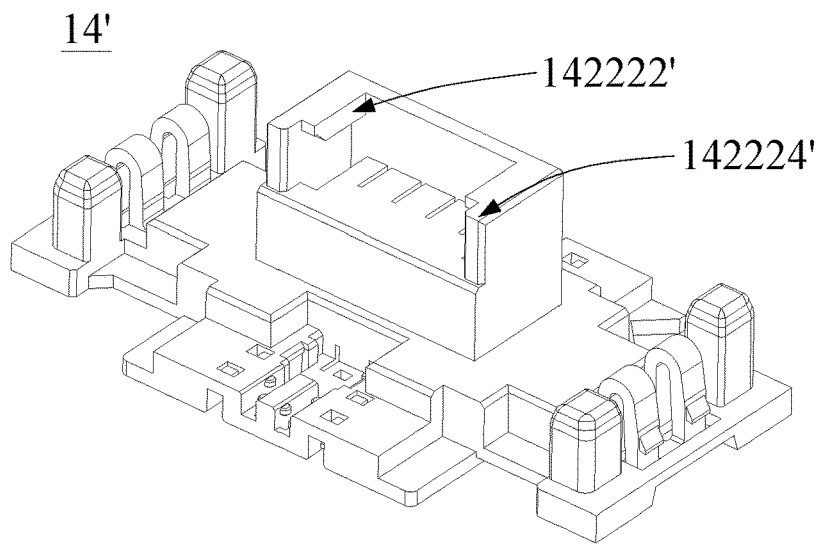
FIG. 29(b) is a schematic perspective diagram illustrating the second connecting component shown in FIG. 29(a) in accordance with the present disclosure.
Figure 29C:
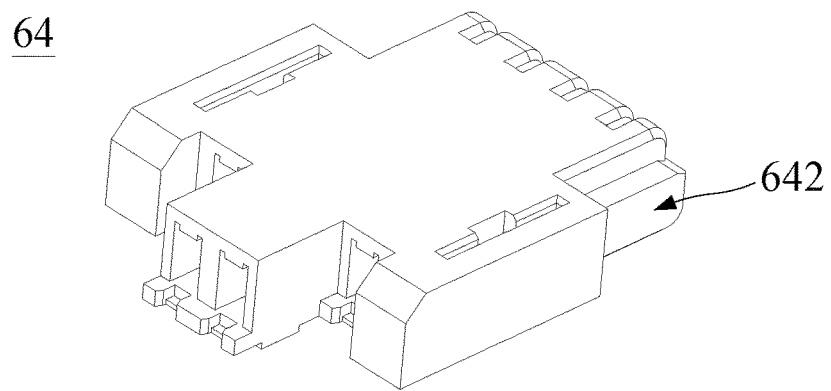
FIG. 29(c) is a schematic perspective diagram illustrating the transmission portion shown in FIG. 29(a) in accordance with the present disclosure
Figure 30:
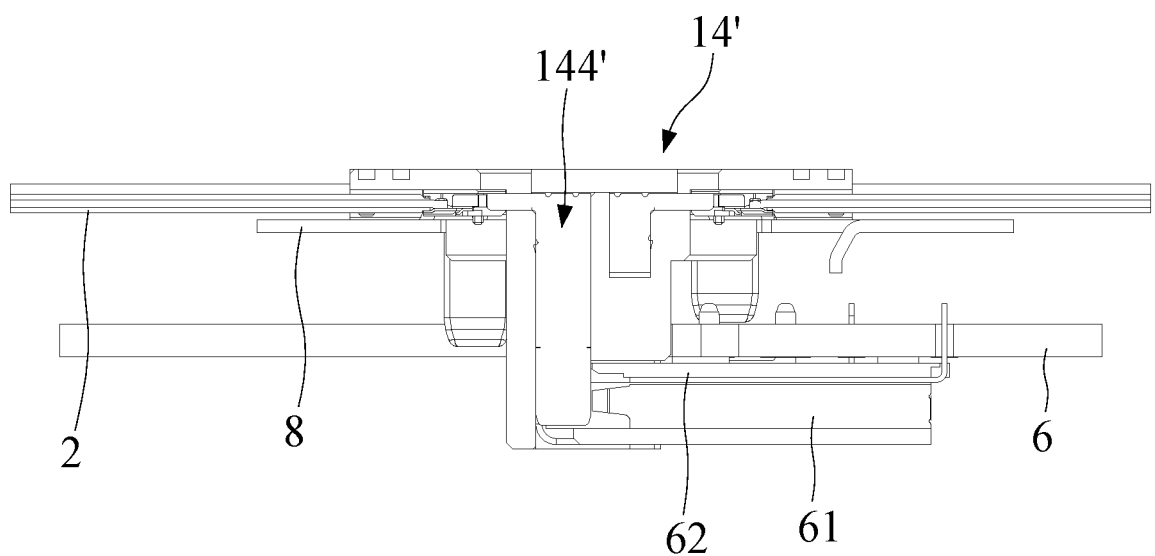
FIG. 30 is a cross-section schematic diagram illustrating the connections between the second connecting component, an outer case and a circuit board in accordance with the present disclosure.
Figure 31:
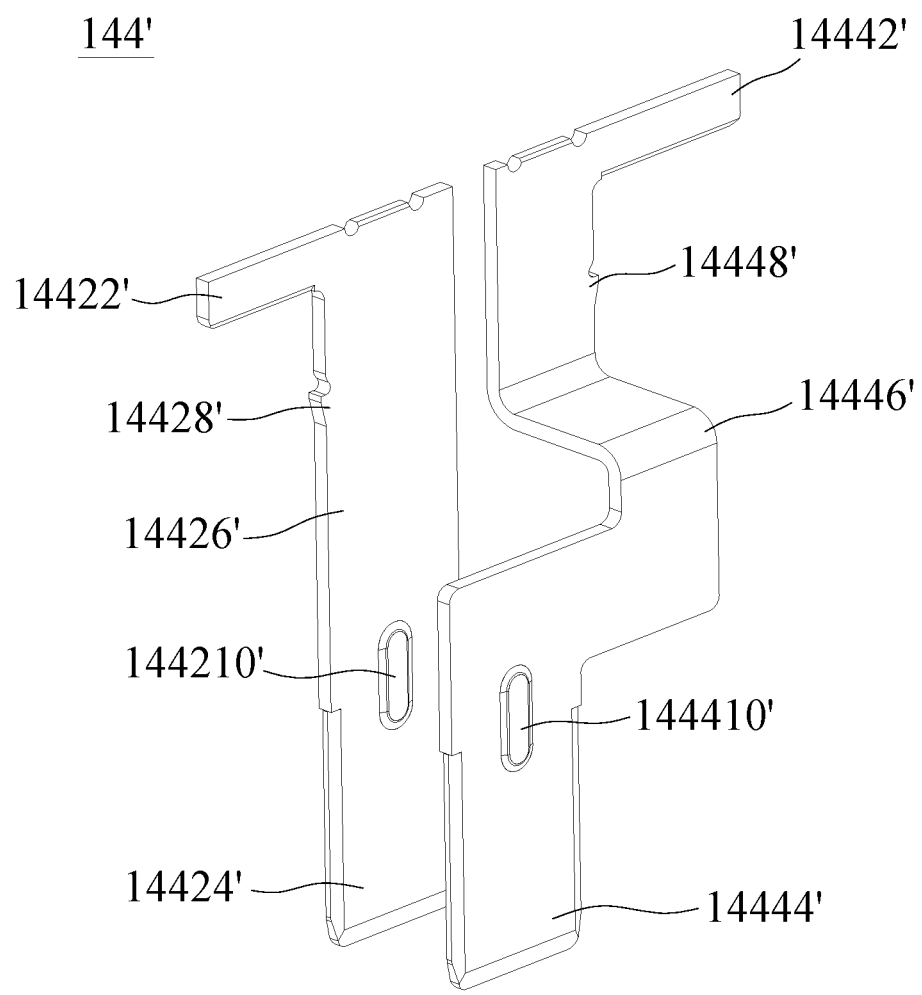
FIG. 31 is a schematic perspective diagram illustrating second conductors of FIG. 28 in accordance with the present disclosure.

FIG. 28 is a schematic perspective diagram depicting the second connecting component of FIG. 17 connected to the cables in accordance with the present disclosure. In FIG. 28, the second connecting component 14' can be connected to the first connecting component 12' via the cables 2 and can be connected to the circuit board 6, such that at least one of signals and power can be transmitted between the second connecting component 14' and the circuit board 6. The design herein is similar to the designs described with respect to the second embodiment and other embodiments, and will not be further described in details. Furthermore, the second connecting component 14' has a second surface SF2 and a fourth surface SF4, and the cables 2 can be provided on the second surface SF2 and the fourth surface SF4. FIG. 29(a) is a schematic perspective diagram illustrating the second connecting component of FIG. 28 combined with a transmission portion in accordance with the present disclosure; FIG. 29(b) is a schematic perspective diagram illustrating the second connecting component shown in FIG. 29(a) in accordance with the present disclosure; FIG. 29(c) is a schematic perspective diagram illustrating the transmission portion shown in FIG. 29(a) in accordance with the present disclosure; FIG. 30 is a cross-section schematic diagram illustrating the connections between the second connecting component, an outer case and a circuit board in accordance with the present disclosure; and FIG. 31 is a schematic perspective diagram illustrating second conductors of FIG. 28 in accordance with the present disclosure.

The present embodiment is different from the previous embodiments in that the second body 1422' of the second connecting component 14' further includes a receiving portion 14222' that corresponds to a circuit board containing a transmission portion 64. One ends of the second conductors 144' of the second connecting component 14' are exposed from the receiving portion 14222', and one ends of the second terminals 62 are exposed from the transmission portion 64. By engaging the receiving portion 14222' with the transmission portion 64, the one ends of the second conductors 144' are electrically connected to the second terminals 62. In this embodiment, the receiving portion 14222' is a plurality of recesses having retaining walls 142222' and stop points 142224', and the transmission portion 64 has a plurality of track guiding blocks 642. The recesses are disposed correspondingly to the track guiding blocks 642. The track guiding blocks 642 can be directed in a direction into the recesses until the transmission portion 64 touches the stop points 142224', whereby the transmission portion is positioned in the recesses. It should be noted that the second conductors 144' assume different structures on the inner side and on the outer side. A second conductor 144' on the inner side has a first end 14422', a second end 14424' and a body 14426'. In addition, the body 14426' is further provided with a fastening structure 14428' and a limiting structure 144210'; while a second conductor 144' on the outer side has a first end 14442', a second end 14444' and a body 14446'. The body 14446' is further provided with a fastening structure 14448' and a limiting structure 144410', wherein the body 14446' is bent according to the position of the receiving portion 14222'.

The present invention is disclosed by the preferred embodiments in the aforementioned description; however, it is contemplated for one skilled at the art that the embodiments are applied only for an illustration of the present invention rather than are interpreted as a limitation for the scope of the present invention. It should be noted that the various substantial alternation or replacement equivalent to these embodiments shall be considered as being covered within the scope of the present invention. Therefore, the protection scope of the present invention shall be defined by the claims.

What is claimed is:

1. A module connector for transmitting signals and power between a light strip and a circuit board via a plurality of cables, wherein the light strip includes a plurality of first terminals and the circuit board includes a plurality of second terminals, the module connector comprising:
    a first connecting component for connecting with the light strip and accommodating the cables, the first connecting component further including:
        a first base including a first body, a plurality of first cable grooves, a plurality of first through holes and a plurality of third cable grooves, the first body having a first surface and a third surface, the first body forming the first cable grooves and the third cable grooves in order to accommodate the cables, central axes of the first through holes being at a first angle with the first cable grooves and passing through the first body, and one ends of the first through holes communicate with the first cable grooves, wherein the first cable grooves and the third cable grooves are recessed from at least one of the first surface and the third surface;
        a plurality of first conductors arranged in the first cable grooves, one ends of the first conductors connected to one ends of the cables, while the other ends of the first conductors connected to the first terminals; and
        a plurality of first clamping parts provided in at least one of the first cable grooves or the third cable grooves for securing the cables in the first cable grooves and the third cable grooves; and
    a second connecting component for connecting with the first connecting component via the cables and for connecting with the circuit board, so as to transmit at least one of the signals and the power between the second connecting component and the circuit board.

2. The module connector of claim 1, wherein the first connecting component further includes a plurality of first locking portions and first fastening portions, a plurality of deformation space are formed from the first locking portions and the first body, a plurality of first locking parts are formed on at least one of inner sides and outer sides of the deformation space, a plurality of first fastening parts are formed on the first fastening portions, the first locking parts are positioned correspondingly to the first fastening parts, the first fastening parts are secured to the light strip, the first connecting component is secured to the light strip by engaging the first locking parts with the first fastening parts.

3. The module connector of claim 2, wherein the first locking portions include a plurality of first pressing portions, by applying an external force to the first pressing portions, the shapes of the deformation space are changed, allowing the first locking parts to be disengaged from the first fastening parts.

4. The module connector of claim 3, wherein the first body further includes first limiters formed in the deformation space.

5. The module connector of claim 2, wherein the first fastening portions include the first fastening parts comprising a plurality of third pressing portions, by applying an external force to the third pressing portions, the shapes of the first fastening parts are changed, allowing the first locking parts to be disengaged from the first fastening parts.

6. The module connector of claim 2, wherein the first body further includes first guiding parts, and the first fastening portion further includes third guiding parts, the first guiding parts are disposed correspondingly to the third guiding parts.

7. The module connector of claim 2, wherein the first fastening parts are at least one of ring-shaped structures, groove structures and elastic pressing structures.

8. The module connector of claim 7, wherein when the first fastening parts are elastic pressing structures, the first fastening parts have double U-shaped long arms.

9. The module connector of claim 1, wherein at least one of the cables are provided in both the first cable grooves and the third cable grooves to form an electrical circuit.

10. The module connector of claim 1, further comprising a plurality of first cable assembly and a plurality of first assembly notches are further formed in the first body, the first cable assembly are disposed correspondingly to the first assembly notches, the first cable assembly are connected to one ends of at least two of the cables, and the first assembly notches communicate with at least two of the first cable grooves and at least two of the first through holes, wherein the first assembly notches are recessed from at least one of the first surface and the third surface of communicating with the first cable grooves or the third cable grooves.

11. The module connector of claim 10, wherein a plurality of third locking parts are formed on the first cable assembly and a plurality of third fastening parts are formed on the first assembly notches for fastening the first cable assembly in the first assembly notches.

12. The module connector of claim 10, wherein the first cable grooves include a plurality of fifth surfaces and a plurality of seventh surfaces, there is a difference in level between the fifth surface and the seventh surface, resulting in bends in the cables.

13. The module connector of claim 10, wherein the first body further includes a plurality of first indicating holes, and a plurality of first indicators are formed on the first cable assembly, the first indicating holes are disposed correspondingly to the first indicators, based on the first indicators shown in the first indicating holes, how the first cable assembly and the cables are assembled in the first assembly notches is determined.

14. The module connector of claim 1, wherein the first body further includes a plurality of first holding grooves, the first holding grooves are formed in at least one of the first cable grooves and the third cable grooves for accommodating the first clamping parts.

15. The module connector of claim 1, wherein the first connecting component further includes a first lid having a third body, and a plurality of fifth locking portions are formed on the periphery of the third body, and the first body further includes a plurality of seventh locking portions, the fifth locking portions are disposed correspondingly to the seventh locking portions, the fifth locking portions are engaged with the seventh locking portions to cover the first cable grooves.

16. The module connector of claim 15, wherein the first lid further includes a plurality of cable fasteners, the cable fasteners are formed on the third body and corresponding to the first cable grooves, the cables are positioned in the first cable grooves and at one ends of the first conductors by combining the first lid and the first base.

17. The module connector of claim 15, wherein the first lid further includes a third lid having a plurality of tabs, and the first body further include a plurality of blind holes, the first tabs are disposed correspondingly to the first blind holes for covering portions of the first cable grooves and the third cable grooves.

18. A module connector for transmitting signals and power between a light strip and a circuit board via a plurality of cables, wherein the light strip includes a plurality of first terminals and the circuit board includes a plurality of second terminals, the module connector comprising:
a first connecting component for connecting with the light strip and accommodating the cables,
a second connecting component for connecting with the first connecting component via the cables and for connecting with the circuit board, so as to transmit at least one of the signals and the power between the second connecting component and the circuit board, the second connecting component further comprising:
a second base including a second body, a plurality of second cable grooves, a plurality of fourth cable grooves and a plurality of second through holes, the second body having a second surface and a fourth surface, the second body forming the second cable grooves and the fourth cable grooves in order to accommodate the cables, central axes of the second through holes being at a second angle with the second cable grooves and passing through the second body, and one ends of the second through holes communicate with the second cable grooves, wherein the second cable grooves and the fourth cable grooves are recessed from at least one of the second surface and the fourth surface;
a plurality of second conductors arranged in the second cable grooves and the second through holes, one ends of the second conductors connected to the other ends of the cables, while the other ends of the first conductors connected to the second terminals; and
a plurality of second clamping parts provided in at least one of the second cable grooves or the fourth cable grooves for securing the cables in the second cable grooves and the fourth cable grooves.

19. The module connector of claim 18, wherein the second base further includes a plurality of elastic parts formed on two sides of the second body for securing the second connecting component to an outer case having an opening.

20. The module connector of claim 18, wherein second limiters are formed on the outer edges of the second conductors for securing to the second through holes.

21. The module connector of claim 18, wherein the second body further includes a plurality of second holding grooves, the second holding grooves are formed in at least one of the second cable grooves and the fourth cable grooves for holding the second clamping parts.

22. The module connector of claim 18, further comprising a plurality of second cable assembly, and a plurality of second assembly notches are further formed in the second body, the second cable assembly are arranged correspondingly to the second assembly notches, the second cable assembly are connected to one ends of at least two of the cables, and the second assembly notches communicate with at least two of the second cable grooves and at least two of the second through holes, wherein the second assembly notches are recessed from at least one of the second surface and the fourth surface for communicating with the second cable grooves or the fourth cable grooves.

23. The module connector of claim 22, wherein the second body further includes a plurality of second indicating holes, and a plurality of second indicators are formed on the second cable assembly, the second indicating holes are disposed correspondingly to the second indicators, based on the second indicators shown in the second indicating holes, how the second cable assembly and the cables are assembled in the second assembly notches is determined.

24. The module connector of claim 22, wherein the second assembly grooves further include a plurality of second positioning parts, and a plurality of fourth positioning parts are formed on the second cable assembly, the second positioning parts are disposed correspondingly to the fourth positioning parts, wherein the second positioning parts and the fourth positioning parts include ribs and grooves, respectively.

25. The module connector of claim 22, wherein a second locking portions are formed in the second assembly notches for securing the second cable assembly in the second assembly notches.

26. The module connector of claim 22, wherein the second cable grooves have a plurality of sixth surfaces and a plurality of eighth surfaces, a difference in level exists between the sixth surfaces and the eighth surfaces, resulting in bends in the cables.

27. The module connector of claim 18, wherein the second connecting component further includes a second lid having a fourth body, and a plurality of fourth locking portions are formed on the periphery of the fourth body, and the second base further includes a plurality of sixth locking portions, the fourth locking portions are disposed correspondingly to the sixth locking portions, the second cable grooves are concealed once the fourth locking portions are engaged with the sixth locking portions.

28. The module connector of claim 27, wherein the second lid further includes a plurality of second cable fasteners, the second cable fasteners are formed on the fourth body and arranged correspondingly to the second cable grooves, by engaging the second lid with the second base, the cables can be arranged in the second cable grooves at the ends where the second conductors are located.

29. The module connector of claim 27, wherein the second lid further includes a fourth lid having a plurality of second tabs, and the second body further includes a plurality of blind holes, the second tabs are arranged correspondingly to the second blind holes for covering portions of the second cable grooves and the fourth cable grooves.

30. The module connector of claim 18, wherein the second conductors assume an L shape, and ends of the second conductors can be sheet-like or clamping structures.

31. The module connector of claim 18, wherein the second body further includes a receiving portion that corresponds to the circuit board having a transmission portion, one ends of the second conductors are exposed from the receiving portion, and one ends of the second terminals are exposed from the transmission portion, by engaging the receiving portion with the transmission portion, said one ends of the second conductors are electrically connected to the second terminals.

32. The module connector of claim 31, wherein the receiving portion is a plurality of recesses having retaining walls and stop points, and the transmission portion has a plurality of track guiding blocks, the recesses are disposed correspondingly to the track guiding blocks, the track guiding blocks are slid into the recesses in a direction until the transmission portion touches the stop points, whereby the transmission portion is positioned in the recesses.

* * * * *